United States Patent
Ota et al.

(10) Patent No.: US 8,902,566 B2
(45) Date of Patent: Dec. 2, 2014

(54) CAPACITOR, AND METHOD FOR PRODUCING THE SAME

(75) Inventors: Nobuhiro Ota, Osaka (JP); Akihisa Hosoe, Osaka (JP); Masatoshi Majima, Osaka (JP); Koji Nitta, Osaka (JP); Tomoyuki Awazu, Itami (JP); Kazuki Okuno, Osaka (JP); Masahiro Kato, Itami (JP); Shoichiro Sakai, Osaka (JP); Shinji Inazawa, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 262 days.

(21) Appl. No.: 13/252,409

(22) Filed: Oct. 4, 2011

(65) Prior Publication Data
US 2012/0154982 A1 Jun. 21, 2012

Related U.S. Application Data

(63) Continuation of application No. PCT/JP2011/062200, filed on May 27, 2011.

(30) Foreign Application Priority Data

| | | |
|---|---|---|
| May 31, 2010 | (JP) | 2010-123832 |
| Jun. 4, 2010 | (JP) | 2010-128456 |
| Jun. 4, 2010 | (JP) | 2010-128467 |
| Jun. 4, 2010 | (JP) | 2010-128471 |

(51) Int. Cl.
*H01G 9/00* (2006.01)
*H01G 9/012* (2006.01)
*H01G 9/04* (2006.01)

(52) U.S. Cl.
CPC ............ *H01G 9/012* (2013.01); Y02T 10/7022 (2013.01); Y02E 60/13 (2013.01); *H01G 9/04* (2013.01)
USPC ........... 361/502; 361/508; 361/509; 361/523; 361/525; 361/529

(58) Field of Classification Search
CPC ....... Y02E 60/13; Y02E 60/122; Y02E 60/12; Y02E 60/128; H01G 9/155; H01G 9/038; H01G 9/045; Y02T 10/7011; H01M 4/13
USPC .................. 361/502, 508, 509, 523, 525, 529
See application file for complete search history.

(56) References Cited

U.S. PATENT DOCUMENTS

| | | |
|---|---|---|
| 5,419,789 A | 5/1995 | Kita |
| 5,597,665 A | 1/1997 | Harada et al. |

(Continued)

FOREIGN PATENT DOCUMENTS

| | | |
|---|---|---|
| JP | 55-88272 | 7/1980 |
| JP | 9-232190 | 9/1997 |

(Continued)

OTHER PUBLICATIONS

English Translation of JP 2008-300667. Translated on Apr. 1, 2014.*

(Continued)

*Primary Examiner* — Robert J Hoffberg
*Assistant Examiner* — Hung Dang
(74) *Attorney, Agent, or Firm* — Drinker Biddle & Reath LLP

(57) ABSTRACT

A capacitor has a positive electrode, a negative electrode, and a solid electrolyte layer arranged between the electrode layers. At least one of the electrode layers of this capacitor has an Al porous body, and an electrode body held in this Al porous body to polarize the electrolyte. The oxygen content in the surface of the Al porous body is 3.1% by mass or less. The matter that the oxygen content in the surface of the Al porous body is 3.1% by mass or less is equal to the matter that a high-resistance oxide film is hardly formed on the surface of the Al porous body. Thus, this Al porous body makes it possible to make the current collector area of the electrode layer large so that the capacitor can be improved in capacity.

11 Claims, 3 Drawing Sheets

(56) References Cited

U.S. PATENT DOCUMENTS

| | | | |
|---|---|---|---|
| 5,882,822 A | 3/1999 | Iida et al. | |
| 6,280,878 B1 | 8/2001 | Maruyama et al. | |
| 2009/0034158 A1 | 2/2009 | Sasaki | |
| 2009/0087751 A1 | 4/2009 | Kondo et al. | |
| 2009/0311608 A1* | 12/2009 | Hirose et al. | 429/331 |
| 2011/0020705 A1 | 1/2011 | Ryu et al. | |

FOREIGN PATENT DOCUMENTS

| | | |
|---|---|---|
| JP | 11-150042 | 6/1999 |
| JP | 11-274012 | 10/1999 |
| JP | 2008-71533 | 3/2008 |
| JP | 2008-97991 | 4/2008 |
| JP | 2008-300667 | 12/2008 |
| JP | 2009-200302 | 9/2009 |
| JP | 2010-015720 A | 1/2010 |
| JP | 2010-80419 | 4/2010 |

OTHER PUBLICATIONS

U.S. Appl. No. 13/252,393, Ota et al., filed Oct. 4, 2011.
U.S. Appl. No. 13/252,376, Ota et al., filed Oct. 4, 2011.
U.S. Appl. No. 13/252,289, filed Oct. 4, 2011.
U.S. Appl. No. 13/252,290, filed Oct. 4, 2011.
U.S. Appl. No. 13/252,295, filed Oct. 4, 2011.
U.S. Appl. No. 13/252,298, filed Oct. 4, 2011.

* cited by examiner (A)

(B)

(C)

CAPACITOR, AND METHOD FOR PRODUCING THE SAME

TECHNICAL FIELD

The present invention relates to a capacitor used as a device for accumulating electric energy, and a method for producing the capacitor.

BACKGROUND ART

Recently, attention has been paid to electric double layer capacitors since the capacitors, out of various capacitors, have a large capacity. For example, any capacitor is widely used as a memory backup for electrical equipment. In recent years, in this use manner, the use of an electric double layer capacitor has been promoted. Furthermore, the use thereof is expected for automobiles, such as hybrid cars and fueled vehicles.

Electric double layer capacitors are classified into button-shaped, cylindrical, rectangular, and other types, and capacitors of various types are known. The button-shaped capacitor is produced, for example, by preparing a pair of polarizable electrodes in each of which an activated carbon electrode is set on a current collector, arranging a separator therebetween to form an electric double layer capacitor element, packing the element together with an electrolyte into a metallic case, and sealing up the case with an opening-sealing material and a gasket for insulating the two from each other. The cylindrical capacitor is produced by stacking such paired polarizable electrodes and a separator onto each other, winding the workpiece to form an electric double layer capacitor element, impregnating this element with an electrolytic solution, packing the element into an Al case, and sealing up the case with an opening-sealing material. About the rectangular capacitor also, the basic structure thereof is similar to that of the button-shaped or cylindrical capacitor.

The electric double layer capacitors used for memory backups, automobiles and others are desired to be made higher in capacity and others. In other words, the capacitors are desired to be made higher in capacity per unit volume, and lower in internal resistance. For this purpose, various suggestions are made about a current collector that constitutes each of their electrodes. As the current collector, known are, for example, a current collector using a foil-piece, network-form, or punched metal of Al, stainless steel or some other metal (Patent Literature 1), a current collector wherein a mat made of a stainless steel fiber is electrically welded to a stainless steel foil piece (Patent Literature 2), a current collector using a porous body having a lath plate structure made of at least one metal of tantalum, Al and titanium (Patent Literature 3), and other current collectors.

CITATION LIST

Patent Literatures

Patent Literature 1: Japanese Unexamined Patent Publication No. 11-274012
Patent Literature 2: Japanese Unexamined Patent Publication No. 09-232190
Patent Literature 3: Japanese Unexamined Patent Publication No. 11-150042

SUMMARY OF INVENTION

Technical Problem

However, any conventional capacitor has a problem that when an attempt is made for increasing the capacity thereof, the internal resistance thereof becomes large so that the capacity is not increased. Specifically, when the capacitor has a structure wherein the shape of its current collectors is a two-dimensional form and an activated carbon sheet is caused to adhere onto each of the current collectors, it is necessary to make the activated carbon sheet thick in order to make the capacity density high. However, when such an attempt is made, the distance between the current collector and the activated carbon becomes long so that the activated carbon becomes high in electric resistance at its sites apart from the current collector. As a result, the availability ratio of the activated carbon is decreased so that the capacity density is also reduced. About the above-mentioned internal resistance decrease, a conduction aid may be added in order to improve the electric resistance. The addition makes the proportion of the activated carbon small so that the capacity density is reduced, as well.

At present, as a mass-producible three-dimensional-structure current collector, known is a foamed Ni porous body obtained by plating a foamed resin with Ni, and then removing the resin. This body has been spreading as a current collector for an alkaline electrolyte secondary battery. However, in electric double layer capacitors, wherein a nonaqueous electrolyte is used to make the voltage and the capacity thereof high, Ni is easily oxidized by the nonaqueous electrolytic solution. Thus, at a high voltage (about 4.2 V relative to the Li potential), Ni is unfavorably dissolved in the electrolytic solution so that the capacitors cannot be sufficiently charged by charging and discharging over a long term.

As described above, a current collector produced by plating a porous resin with Ni is poor in corrosion resistance, so that the current collector cannot endure, in a nonaqueous capacitor, a high charge and discharge voltage thereof. A candidate for a metal for covering a porous resin is, besides Ni, Al or stainless steel, which is high in corrosion resistance. However, the metal is not easily made into a porous body, and only a nonwoven fabric or lath plate-form body is obtained therefrom. Thus, the metal has a problem that a porous body having a foamed structure cannot be obtained therefrom. Al itself is widely used for a current collector of positive electrode. However, in order to yield a porous body having a foamed structure, Al cannot be used to plate an organic resin or some other in an aqueous solution system. A porous resin can be coated with Al by a gas phase method such as vapor deposition or sputtering, or a plating method using a molten salt. However, for the removal of the resin, the Al-plated resin is required to be heated in the atmospheric air, and in this step Al is oxidized. Thus, the resultant cannot be used as a current collector.

Stainless steel is also widely used as a raw material of a current collector of positive electrode. However, for the same reason as that for Al, stainless steel is not easily made into a current collector large in porosity by plating the surface of an organic resin with the steel. About stainless steel, provided is a method of making the steel into a powdery form, painting the powder onto an organic resin porous body, and then sintering the workpiece, thereby yielding a porous body. However, the stainless steel powder is very expensive. Moreover, after the adhesion of the powder, the organic resin porous body, which is a base material, is fired and removed to result in a problem that the resultant stainless steel porous body becomes poor in strength so that the porous body cannot be used. Additionally, the porous body cannot be produced as a uniform porous body; thus, the body is unsuitable for a current collector.

In light of the above-mentioned problems, the present invention has been made, and an object thereof is to provide a capacitor high in capacity and excellent in endurance, and a method for producing the capacitor.

Solution to Problem

In order to solve the above-mentioned problems, the inventors have repeatedly made eager investigations to succeed in the production of an Al porous body having a foamed structure, and found out that the use of this Al porous body as a current collector of a capacitor is effective. Thus, the present invention has been created. The present invention is as follows:

(1) A capacitor, including a positive electrode, a negative electrode, and an electrolyte layer arranged between these electrodes, wherein at least one of the electrodes includes an Al porous body functioning as a current collector, and an electrode material that is held in this Al porous body to polarize the electrolyte, and an oxygen content in a surface of the Al porous body is 3.1% by mass or less.

(2) The capacitor according to item (1), wherein the electrode material is formed in a film form on the surface of the Al porous body.

(3) The capacitor according to item (1), wherein the electrode material is filled into pores made in the Al porous body.

(4) The capacitor according to any one of items (1) to (3), wherein the electrolyte layer is a solid electrolyte.

(5) The capacitor according to any one of items (1) to (3), wherein the positive electrode includes the Al porous body, and the electrode material that is made mainly of activated carbon, the negative electrode includes a porous metal for the negative electrode, and a negative-electrode active material that is made mainly of an element capable of adsorbing Li ions and releasing the Li ions, and that is filled into pores in the porous metal for the negative electrode, the electrolyte layer is a combination of a nonaqueous electrolytic solution containing a Li salt, and a separator, and Li ions are chemically or electrochemically adsorbed onto the negative electrode.

(6) The capacitor according to item (5), wherein the negative-electrode active material is an alloy or a complex containing 20% by mass or more of the element, and the element is at least one of Al, Sn, and Si.

(7) The capacitor according to item (5) or (6), wherein the porous metal for the negative electrode is a Ni foam that is obtained by coating a urethane foam with Ni, and then burning off the urethane, and that has a porosity of 80% or more and 97% or less, and a Ni deposit amount of 150 g/m$^2$ or more and 600 g/m$^2$ or less.

(8) The capacitor according to any one of items (5) to (7), wherein the porous metal for the negative electrode is a Ni nonwoven fabric that is obtained by coating a nonwoven fabric made from a polyolefin fiber with Ni, and that has a porosity of 80% or more and 97% or less, and a Ni deposit amount of 150 g/m$^2$ or more and 600 g/m$^2$ or less.

(9) The capacitor according to any one of items (5) to (8), wherein the Li salt is one or more selected from the group consisting of LiClO$_4$, LiBF$_4$, and LiPF$_6$, and a solvent in the nonaqueous electrolytic solution is one or more selected from the group consisting of ethylene carbonate, propylene carbonate, butylene carbonate, dimethyl carbonate, diethyl carbonate, and ethylmethyl carbonate.

(10) The capacitor according to any one of items (5) to (9), wherein the capacity of the negative electrode is larger than that of the positive electrode, and the Li-ion-adsorbing amount of the negative electrode is 90% or less of the difference between the positive electrode capacity and the negative electrode capacity.

(11) The capacitor according to any one of items (1) to (3), wherein the positive electrode includes the Al porous body, and the electrode material that is made mainly of activated carbon, the negative electrode includes a metal foil, and a negative-electrode active material that is made mainly of a carbon material capable of adsorbing Li ions and releasing the Li ions, and that is applied onto the metal foil, the electrolyte layer is a combination of a nonaqueous electrolytic solution containing a Li salt, and a separator, and Li ions are chemically or electrochemically adsorbed onto the negative electrode.

(12) The capacitor according to item (11), wherein the carbon material capable of adsorbing Li ions and releasing the Li ions is a graphite-based material, or an easily-graphitizable carbon material.

(13) The capacitor according to item (11) or (12), wherein the metal foil is any one of Cu, Ni, and stainless steel.

(14) The capacitor according to any one of items (11) to (13), wherein the Li salt is one or more selected from the group consisting of LiClO$_4$, LiBF$_4$, and LiPF$_6$, and a solvent in the nonaqueous electrolytic solution is one or more selected from the group consisting of ethylene carbonate, propylene carbonate, butylene carbonate, dimethyl carbonate, diethyl carbonate, and ethylmethyl carbonate.

(15) The capacitor according to any one of items (11) to (14), wherein the capacity of the negative electrode is larger than that of the positive electrode, and the Li-ion-adsorbing amount of the negative electrode is 90% or less of the difference between the positive electrode capacity and the negative electrode capacity.

(16) The capacitor according to any one of items (1) to (15), wherein the content of Al in the Al porous body is 95% by mass or more.

(17) The capacitor according to any one of items (1) to (16), wherein the Al porous body has a metal deposit amount of 150 g/m$^2$ or more and 600 g/m$^2$ or less.

(18) The capacitor according to any one of items (1) to (17), wherein the Al porous body has an average pore diameter of 200 μm or more and 800 μm or less.

(19) The capacitor according to any one of items (1) to (18), wherein the Al porous body has a thickness of 0.2 mm or more and 3 mm or less.

(20) A method for producing a capacitor including a positive electrode, a negative electrode, and an electrolyte layer arranged between these electrodes, including:

a step of preparing an Al porous body that is to be a current collector of one of the electrodes, the surface of the body having an oxygen content of 3.1% by mass or less, and a step of forming an electrode material for polarizing the electrolyte into a film form on the surface of the Al porous body, thereby producing either one of the positive electrode and the negative electrode, wherein the electrode material is formed by a gas phase method.

(21) A method for producing a capacitor including a positive electrode, a negative electrode, and a solid electrolyte layer arranged between these electrodes, including:

a step of preparing an Al porous body that is to be a current collector of one of the electrodes, the surface of the body having an oxygen content of 3.1% by mass or less, a step of filling, into pores made in the Al porous body, a mixture containing conductive particles that are to be an electrode material for polarizing the electrolyte, and a step of pressing the Al porous body into which the mixture is filled, thereby forming the Al porous body into either one of the positive electrode and the negative electrode.

Advantageous Effects of Invention

The capacitor of the present invention has an Al porous body which has a large current collector area and hardly has a high-resistance oxide film formed; thus, the capacitor has a larger capacity than conventional capacitors. This is because its current collector is made to have a porous structure of Al, and an electrode material is arranged in pores therein, whereby the contact between the electrode material and the current collector is kept even when the electrode is made thick to increase the capacity. Moreover, the use of this Al porous body as the current collector makes it possible to make the voltage of the capacitor stably high, and improve the lifespan of the capacitor.

BRIEF DESCRIPTION OF DRAWINGS

FIG. 2(A) illustrates a partially enlarged section of a resin body having continuous pores.

DESCRIPTION OF EMBODIMENTS

Hereinafter, the capacitor of the present invention and an example of a method for producing the capacitor will be described with reference to the drawings.

Embodiment 1

Figure 1:
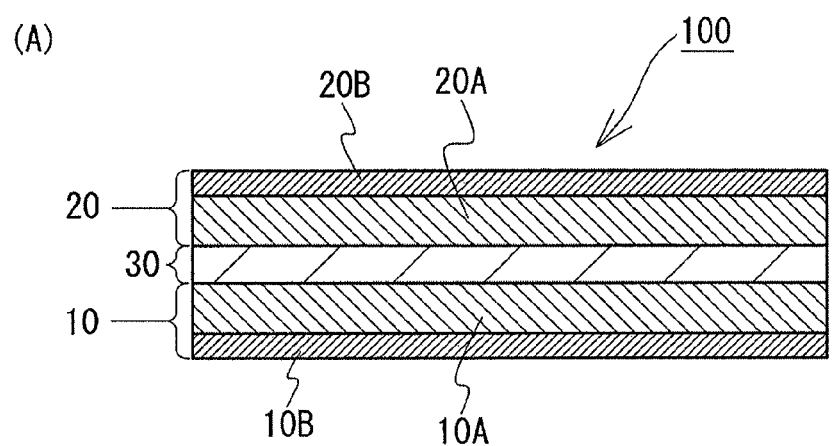
FIG. 1(A) is a schematic structural view of a capacitor according to an embodiment.
FIG. 1(B) is a schematic structural view referred to in order to describe a structure wherein an electrode material constituting an electrode of the capacitor is formed into a film form on the surface of an Al porous body.
FIG. 1(C) is a schematic structural view referred to in order to describe a structure wherein the electrode material is filled in pores in the Al porous body.
Figure 1:
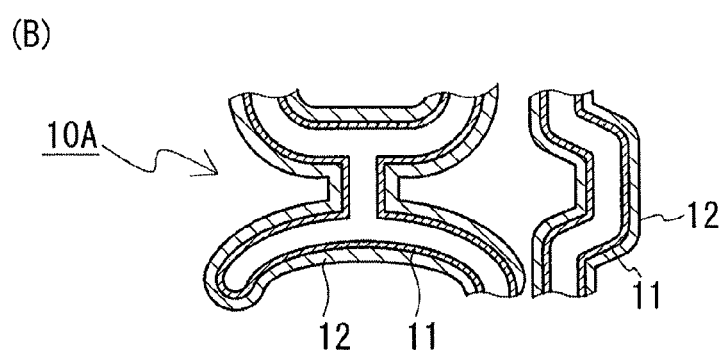
Figure 1:
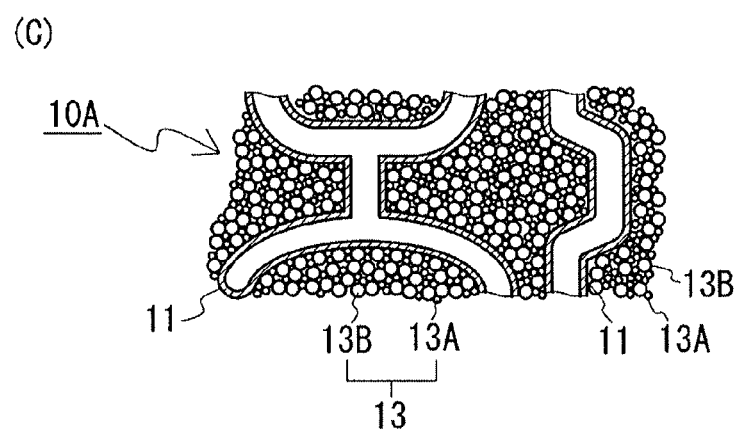

A capacitor 100 illustrated in FIG. 1 has a structure wherein an electrolyte layer 30 is sandwiched between a positive electrode 10 and a negative electrode 20. The positive electrode 10 has a positive electrode body 10A, and a substrate 10B for supporting the positive electrode body 10A, and the negative electrode 20 has a negative electrode body 20A, and a substrate 20B for supporting the negative electrode body 20A. The substrates 10B and 20B may be omitted. Hereinafter, each of the structural elements of this capacitor 100 will be described in detail.

<<Positive Electrode>>

The positive electrode body 10A of the positive electrode 10 is fixed onto the substrate 10B, which has an electrically insulating property, such as a polyethylene sheet, through an adhesive agent made of a resin. This positive electrode body 10A has an Al porous body which has, therein, pores made to be continuous to each other, and which hardly has independent pores, and an electrode material held in this Al porous body 11 to polarize the electrolyte. The structure of the electrode material is roughly classified into two types, and the structure of each of the types will be described later with reference to FIGS. 1(B) and 1(C). The Al porous body 11 is first described in detail with reference to FIG. 2 and FIG. 3.

[Al Porous Body]

The Al porous body 11 contains Al as a main component. If the amount of impurities is large in the Al porous body 11, the operation of the capacitor 100 is unstable at a high voltage or the Al porous body 11 is short in strength. It is therefore preferred that the Al porous body 11 has an Al content of 95% by mass or more.

If the metal deposit amount of the Al porous body 11 is too small, the Al porous body 11 is high in electric resistance or short in strength. On the other hand, if the metal deposit amount is too large, costs required for plating increase unfavorably when the Al porous body 11 is produced. Thus, the metal deposit amount of the Al porous body 11 is preferably 150 g/m$^2$ or more and 600 g/m$^2$ or less, more preferably from 170 to 400 g/m$^2$.

If the diameter of the pores in the Al porous body 11 is too small, the inside of the porous body is not plated or the electrode material is not easily filled thereinto. If the pore diameter is too large, the porous body is lowered in performance of holding the electrode material so that the capacitor is lowered in capacity or deteriorated in power collecting performance. As a result, the capacitor is unfavorably declined in power. Thus, the average pore diameter of the Al porous body 11 is preferably 5 μm or more and 800 or less, more preferably 200 μm or more and 800 μm or less, most preferably 300 μm or more and 600 μm or less. The porosity of the Al porous body 11 is preferably 80% or more and 98% or less.

If the thickness of the Al porous body 11 is too small, the filling amount of activated carbon is reduced so that the capacitor is decreased in capacity. On the other hand, if the thickness is too large, the body is unevenly plated or in the electrode-forming step the body is largely deformed to be broken. Thus, the capacitor is deteriorated in power collecting performance to be unfavorably declined in power. Thus, the thickness of the Al porous body 11 is preferably 0.2 mm or more and 3 mm or less, more preferably from 0.4 to 1.5 mm.

The largest characteristic of the Al porous body 11 is in that the oxygen content in the surface thereof is 3.1% by mass or less. The oxygen content referred to herein is a value obtained by analyzing the surface of the Al porous body 11 quantitatively by EDX (energy dispersive X-ray anaysis) under an accelerating voltage of 15 kV. The wording "the oxygen content is 3.1% by mass or less" means not more than the detection limit thereof according to EDX.

The Al porous body 11, which is to be a current collector, may be formed by, for example, a production method including the step described below.

Production method: an Al layer is formed on the resin surface of a resin body having continuous pores, and subsequently while a potential lower than the standard electrode potential of Al is applied to the Al layer in the state that the resin body is immersed in a molten salt, the present workpiece is heated to the melting point of Al or lower, thereby thermally decomposing the resin body.

Figure 2:
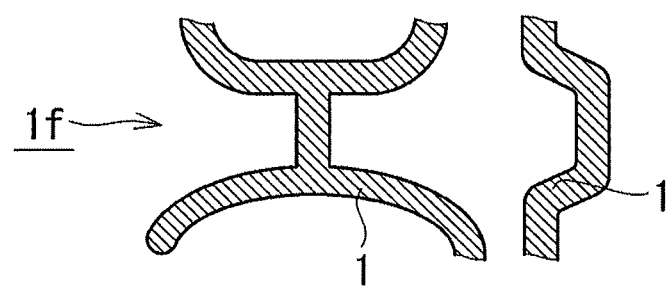
FIG. 2(A) to FIG. (C) are schematic views referred to in order to describe steps of producing an Al porous body.
FIG. 2(B) illustrates a state that an Al layer is formed on the surface of a resin constituting the resin body.
FIG. 2(C) illustrates the Al porous body, which is obtained by decomposing the resin body thermally to remove the resin in the state that the Al layer remains.
Figure 2:
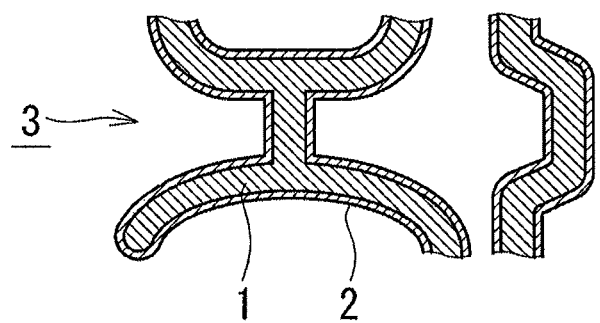
Figure 2:
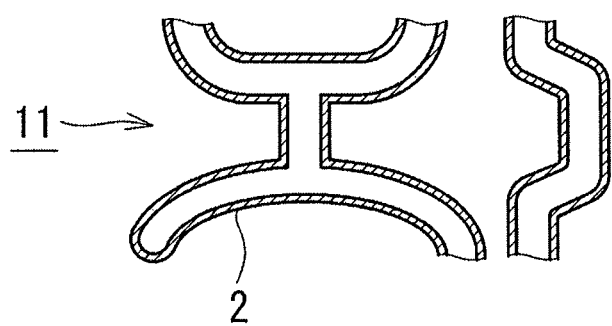

This method for the production of the Al porous body will be described with reference to FIG. 2.

(Resin Body Having Continuous Pores)

FIG. 2(A) illustrates a partial enlarged sectional view of a resin body 1f having continuous pores. In the resin body 1f, the continuous pores are made in a resin 1 as a skeleton. The resin body 1f having the continuous pores may be, besides a foamed resin, a nonwoven fabric made of a resin fiber. The resin constituting the resin body 1*f* may be any resin that can be thermally decomposed at a heating temperature that is equal to or lower than the melting point of Al. Examples thereof include polyurethane, polypropylene, and polyethylene. In particular, a urethane foam is high in porosity, uniform in pore diameter, and excellent in pore-continuity and thermal decomposability; thus, it is preferred to use, for the resin body 1*f*, a urethane foam. Preferably, the pore diameter of the resin body 1*f* is from about 5 to 800 μm, and the porosity thereof is from about 80 to 98%. The pore diameter and the porosity of the finally obtained Al porous body 11 is affected by the pore diameter and the porosity of the resin body 1*f*. Thus, the pore diameter and the porosity of the resin body 1*f* are decided in accordance with the pore diameter and the porosity of the Al porous body 11 to be formed.

(Formation of Al Layer onto Resin Surface)

FIG. 2(B) illustrates a situation that an Al layer 2 is formed on the surface of the resin 1 of the resin body having the continuous pores (i.e., an Al-layer-coated resin body 3). Examples of a method for forming the Al layer 2 include (i) a gas phase method (PVD method), typical examples of which include a vacuum vapor deposition, a sputtering method and a laser ablation method, (ii) a plating method, and (iii) a paste painting method.

(i) Gas Phase Method

In the vacuum vapor deposition, for example, an electron beam is radiated onto Al as a raw material to melt and vaporize Al to deposit the Al onto the resin surface of the resin body 1*f* having the continuous pores, whereby the Al layer 2 can be formed. In the sputtering method, for example, plasma is radiated onto an Al target to gasify the Al so as to be deposited onto the resin surface of the resin body 1*f* having the continuous pores, whereby the Al layer 2 can be formed. In the laser ablation method, for example, Al is molten and vaporized by irradiation with a laser to deposit the Al onto the resin surface of the resin body 1*f* having the continuous pores, whereby the Al layer 2 can be formed.

(ii) Plating Method

A matter or object can be hardly plated with Al in an aqueous solution for practical use. Thus, according to a molten salt electroplating method wherein plating with Al is attained in a molten salt, the Al layer 2 can be formed on the resin surface of the resin body 1*f* having the continuous pores. In this case, it is preferred to subject the resin surface beforehand to an electrically conducting treatment, and then plate the surface with Al in a molten salt.

The molten salt used in the molten salt electroplating may be, for example, Li chloride (LiCl), sodium chloride (NaCl), potassium chloride (KCl), Al chloride ($AlCl_3$), or some other salt. The molten salt may be a eutectic molten salt wherein two or more salts are mixed with each other. It is favorable to render the molten salt the eutectic molten salt since the molten salt can be lowered in melting temperature. This molten salt needs to contain Al ions.

In the molten salt electroplating, use is made of, for example, a two-component salt of $AlCl_3$ and XCl wherein X is an alkali metal, or a multi-component salt of $AlCl_3$, XCl wherein X is an alkali metal, and $MCl_x$ wherein M is an element selected from transition metal elements such as Cr and Mn; this salt is molten to prepare a plating liquid; and then the resin body 1*f* is immersed in this liquid to conduct electroplating, thereby plating the surface of the resin with Al. It is preferred to conduct, as a pretreatment for the electroplating, an electrically conducting treatment beforehand onto the resin surface. Examples of the electrically conducting treatment include a treatment of plating the resin surface with a conductive metal such as Ni by electroless plating, a treatment of coating the resin surface with a conductive metal such as Al by a vacuum vapor deposition or a sputtering method, and a treatment of painting a conductive paint containing conductive particles made of carbon or some other thereonto.

(iii) Paste Painting Method

In the paste painting method, use is made of, for example, an Al paste wherein an Al powder, a binder, and an organic solvent are mixed with each other. The Al paste is painted onto the resin surface, and then heated to remove the binder and the organic solvent and further sinter the Al paste. The sintering may be performed once, or may be dividedly performed plural times. For example, by painting the Al paste onto the resin body, heating the resin body at low temperature to remove the organic solvent, and then heating the resin body in the state of being immersed in a molten salt, the resin body 1*f* can be thermally decomposed and simultaneously the Al paste can be sintered. The sintering is preferably performed in a non-oxidizing atmosphere.

(Thermal Decomposition of Resin Body in Molten Salt)

FIG. 2(C) illustrates a situation that from the Al-layer-coated resin body 3 illustrated in FIG. 2(B), the resin is removed by decomposing the resin 1 thermally while the Al layer 2 is caused to remain (i.e., the Al porous body 11). The thermal decomposition of the resin body 1*f* (resin 1) is attained by heating the body at the melting point of Al or lower while a low potential is applied to the Al layer 2 in the state that the body is immersed in a molten salt. As illustrated in, for example, FIG. 3, the resin body on the surface of which the Al layer is formed (i.e., the Al-layer-coated resin body 3) and a counter electrode (positive electrode) 5 are immersed in a molten salt 6, and a potential lower than the standard electrode potential of Al is applied to the Al layer. By the application of the lower potential to the Al layer in the molten salt, the oxidation of the Al layer can be certainly prevented. The potential applied to the Al layer is made lower than the standard electrode potential of Al and further higher than the potential for reducing the cation of the molten salt. For the counter electrode, any material that is insoluble in the molten salt may be used, and the material may be, for example, platinum or titanium.

While this state is kept, the molten salt 6 is heated to a temperature which is equal to or lower than the melting point (660° C.) of Al and is further equal to or higher than the thermal decomposition temperature of the resin body, thereby removing only the resin from the Al-layer-coated resin body 3. In this way, the resin can be thermally decomposed without oxidizing the Al layer. As a result, the Al porous body 11 can be yielded wherein the oxygen content in the surface is 3.1% by mass or less (see FIG. 2(C)). It is advisable to properly set the heating temperature for decomposing the resin body thermally in accordance with the kind of the resin constituting the resin body. For example, the temperature is preferably set into the range of 500° C. or more and 600° C. or less.

The molten salt used in the step of decomposing the resin body thermally may the same as used in the above-mentioned molten salt electroplating. The salt preferably contains at least one selected from the group consisting of Li chloride (LiCl), sodium chloride (NaCl), potassium chloride (KCl), and Al chloride ($AlCl_3$). The molten salt may be a halide salt of an alkali metal or an alkaline earth metal to make the potential of the Al layer lower. In order to make the melting temperature of the molten salt equal to or lower than the melting point of Al, two or more salts may be mixed with each other to prepare a eutectic molten salt. In the step of decomposing the resin body thermally, the use of the eutectic molten salt is effective since Al particularly is easily oxidized and does not undergo a reducing treatment easily.

In a different manner, the Al porous body 11 can be produced by immersing, in supercritical water, a foamed resin having, on the surface thereof, a metal layer made mainly of Al and having continuous pores, thereby decomposing the foamed resin. Supercritical water, which is in the state of a high temperature and a high pressure over the critical point of water (critical temperature: 374° C., and critical pressure: 22.1 MPa), is excellent in performance of decomposing organic substances to make it possible to decompose the foamed resin without oxidizing any metal. In such a production manner, the Al porous body 11 can be yielded which is made mainly of Al and has, on the surface thereof, a small amount of an oxide layer (or a thin oxide layer).

The Al porous body 11 produced by the Al-porous-body-producing method is in a hollow fiber form in light of characteristics of the production method. In this point, the Al porous body 11 is different from the Al foamed body disclosed in Patent Literature 1. The Al porous body 11 has continuous pores, and has no closed pores. Alternatively, even when the Al porous body 11 has closed pores, the volume of the pores is very small. The Al porous body 11 may be made of pure Al (a metal made of Al and inevitable impurities), or may be made of an Al alloy containing an additive element (a body made of an additive element, and the balance composed of Al and inevitable impurities). When the Al porous body 11 is made of the Al alloy, mechanical characteristics of the Al porous body can be made better than when the body is made of pure Al.

[Electrode Material]

The electrode material is made into either one of the following two structures: (i) a structure wherein this material is formed in a film form on the surface of the Al porous body 11, as illustrated in FIG. 1(B); and (ii) a structure wherein the material is filled into pores in the Al porous body 11, as illustrated in FIG. 1(C). Hereinafter, two structures will be separately described.

(i) Electrode Material Formed into a Film Form

A thin-film-form electrode material 12 illustrated in FIG. 1(B) is formed on the surface of the Al porous body 11, and preferably has a structure wherein minute conductive fine particles are dispersed in a matrix of a solid electrolyte. The conductive fine particles are particles for adsorbing/holding ions of the electrolyte. The constituting element of the conductive fine particles is preferably C. The solid electrolyte is preferably, for example, a sulfide such as $Li_2S-P_2S_5$. An oxide such as $P_2O_5$ may be added to this sulfide, $Li_2S-P_2S_5$, to improve the chemical stability of the sulfide solid electrolyte. In this case, it is preferred that the oxygen content in the sulfide solid electrolyte is set not to exceed 10 atomic %. If the oxygen content exceeds 10 atomic %, the diffusion velocity of the electrolyte (Li) ions is lowered so that the speed of a polarization response of the electrolyte to the application of voltage may be declined.

The most important parameter of the electrode material 12 is the average particle diameter of the conductive fine particles since the factor for deciding the capacity of the capacitor 100 is the total surface area of the conductive fine particles, which adsorb the electrolyte ions. Thus, in the capacitor 100 of the present invention, the average particle diameter of the conductive fine particles in the positive electrode 10 is set into the range of 1 to 50 nm. The conductive fine particles having any average particle diameter in this range make it possible to keep sufficiently and certainly the total surface area (the area in which the electrolyte ions can be adsorbed: the adsorption area) of the conductive fine particles in the positive electrode 10.

Another important parameter of the electrode material 12 is the number density of the conductive fine particles in the electrode material 12. Specifically, the number density of the conductive fine particles is preferably set into the range of $5 \times 10^{15}$ to $1 \times 10^{21}$ populations/$cm^3$. In this case, the adsorption area per unit volume of the electrode material 12 is theoretically from about $6 \times 10^5$ to $3 \times 10^7$ $cm^2/cm^3$, and the proportion by volume of the conductive fine particles in the electrode material 12 is from about 40 to 60% by volume. The positive electrode 10 having this electrode material 12 makes it possible to produce the capacitor 100 that has a capacity capable of coping with various usages sufficiently.

A different parameter of the electrode material 12 is the thickness of the electrode material 12. It is advisable to select the thickness of the electrode material 12 appropriately in accordance with a capacity required for the capacitor 100. At this time, the particle diameter of the conductive fine particles and the number density thereof should be naturally considered. For example, the thickness of the electrode material 12 is preferably set into the range of 1 to 500 μm.

The electrode 12, which has been described above, may be formed by a gas phase method wherein the Al porous body 11 is used as a substrate in an Ar atmosphere. The gas phase method may be a physical gas phase method such as a laser ablation method or a vacuum vapor deposition.

In order to form the electrode material 12 by the gas phase method, prepared are first a conductive substance that can physically adsorb ions of the electrolyte, and a solid electrolyte. After the preparation of the conductive substance and the solid electrolyte, the Al porous body 11 is arranged in a chamber. In the chamber, these film-forming materials are simultaneously evaporated from a single evaporation source (crucible), or are separately evaporated from different evaporation sources to form the electrode material 12 into a film on the surface of the Al porous body 11 (including surfaces of the insides of the pores). The electrode material 12 formed into the film by a series of these operations has a structure wherein the conductive substance is dispersed, in a fine particle state, in the matrix of the solid electrolyte.

Meanwhile, the conductive substance evaporated from the evaporation source is turned into the form of fine particles to be directed to the substrate. However, the fine particles aggregate between each other while the particles move from the evaporation source(s) to the substrate, so that the particles turn easily into larger particles. Thus, in order to set the average particle diameter of the conductive fine particles in the electrode material 12 into the range of 1 to 50 nm, it is necessary to hinder the conductive substance particles from aggregating in the film-forming atmosphere. In the present embodiment, Ar is present in the film-forming atmosphere; thus, a chance that the conductive substance particles contact each other is reduced so that the aggregation between the fine particles is hindered.

The atmosphere pressure of Ar for hindering the aggregation between the fine particles has an appropriate range. Specifically, it is preferred to set the atmosphere pressure of Ar into the range of $10^{-2}$ to 1 Pa. When the atmosphere pressure is in this range, the aggregation between the conductive substance particles can be effectively restrained.

Furthermore, the distance of the conductive substance from the evaporation source (crucible) to the substrate 10B is also a factor which has an effect on the degree of the aggregation between the conductive substance particles. Thus, the distance is preferably set into the range of 10 to 70 mm. In this case, the electrode material 12 can be formed into a film while the aggregation between the conductive substance particles is effectively restrained.

(ii) Filled Electrode Material

A filled electrode material 13 illustrated in FIG. 1(C) can be made into a structure containing conductive fine particles 13A and electrolyte fine particles 13B filled into the pores in the Al porous body 11. The materials used in the conductive fine particles 13A and the electrolyte fine particles 13B, respectively, may be the same as used in the electrode material 12 formed into the film form.

The particle diameter of the electrolyte particles 13B is preferably larger than that of the conductive fine particles 13A. Other important parameters of the electrode material 13 are the respective particle diameters of the fine particles 13A and 13B, and the blend ratio therebetween. Specifically, it is preferred to set the particle diameter of the conductive fine particles 13A into the range of 1 to 100 nm, and set that of the electrolyte fine particles 13B into the range of 10 to 100 nm. It is also preferred to set the blend ratio of the conductive fine particles 13A to the electrolyte fine particles 13B into the range of 35/65 to 60/40.

The electrode material 13 described above may be produced, for example, as follows: First, the fine particles 13A and 13B each having a desired particle diameter are produced by mechanical milling or some other, and these fine particles 13A and 13B are mixed with each other by a mixing means such as a ball mill. Next, the mixed material is filled into the pores in the Al porous body 11, and then the Al porous body 11 is compressed, thereby making it possible to produce the electrode material 13, wherein the fine particles 13A and 13B are densely filled in the pores. The pressure for the compression is preferably from 100 to 1000 MPa.

Additionally, an electrode material made mainly of activated carbon may be filled in the pores in the Al porous body 11. In this case, the filling amount (content) of the electrode material filled into the Al porous body 11 is not particularly limited, and may be appropriately decided in accordance with the thickness of the Al porous body 11, the shape of the capacitor, and others. For example, it is advisable to set the filling amount into the range of about 13 mg/cm$^2$ or more and 40 mg/cm$^2$ or less, preferably into that of about 16 mg/cm$^2$ or more and 32 mg/cm$^2$ or less.

The method for the filling of the electrode material may be a known method such as a method of making activated carbon and others into a pasty form, and then putting the activated carbon positive electrode paste thereinto under pressure. Other examples thereof include a method of immersing the current collector in the activated carbon positive electrode paste, and optionally putting the resultant under a reduced pressure, and a method of filling the activated carbon positive electrode paste into the current collector from one direction thereof while the paste is pressured through a pump or some other.

The solvent in the paste may be optionally removed by a drying treatment after the filling of the activated carbon paste. The Al porous body 11 may be optionally subjected to pressure forming by pressing by effect of a roller press machine or some other after the filling of the activated carbon paste. It is advisable to set the thickness before the pressure forming usually into the range of 200 μm or more and 3000 μm or less, preferably into that of 300 μm or more and 1500 μm or less, more preferably into that of 400 μm or more and 1200 μm or less. It is advisable to set the thickness after the pressure forming usually into the range of about 100 μm or more and 1500 μm or less, preferably into that of about 200 μm or more and 700 μm or less.

The activated carbon positive electrode paste is obtained, for example, by stirring an activated carbon powder in a solvent by means of a mixer. The activated carbon paste needs only to contain activated carbon and the solvent. The blend ratio therebetween is not limited. However, in order to make the capacity of the capacitor large, it is better that the amount of the activated carbon as a main component is larger. About the composition ratio after the paste is dried (after the solvent is removed), the proportion of the activated carbon is preferably 90% by mass or more. Examples of the solvent of the activated carbon paste include N-methyl-2-pyrrolidone, and water. In the case of using, particularly, polyvinylidene fluoride as the binder, it is advisable to use, as the solvent, N-methyl-2-pyrrolidone. In the case of using polytetrafluoroethylene, polyvinyl alcohol, carboxymethylcellulose or the like as the binder, it is advisable to use, as the solvent, water. The paste may optionally contain a conduction aid, the binder, a surfactant, and other additives. However, the conduction aid and the binder make the capacity low, and further the binder makes the internal resistance large; thus, it is preferred that the amounts thereof are as small as possible. Preferably, the proportion of the conduction aid is 10% by mass or less, and that of the binder is 10% by mass or less.

The activated carbon may be activated carbon commercially available commonly for an electric double layer capacitor. The starting material of activated carbon is, for example, wood, coconut husk, pulp waste liquor, coal, petroleum heavy oil, coal or petroleum pitch obtained by thermal decomposition thereof, or a resin such as phenol resin. Generally, after the starting material is carbonized, the carbonized material is activated. Examples of the method for the activation include a gas activation method and a chemical activation method. The gas activation method is a method of causing the carbonized material to react catalytically with water vapor, carbon dioxide gas, oxygen and others at high temperature to yield activated carbon. The chemical activation method is a method of impregnating the above-mentioned starting material with a known activating chemical, and heating the resultant in an inert gas atmosphere to generate dehydration and oxidization reactions of the activating chemical, thereby yielding activated carbon. The activating chemical is, for example, zinc chloride or sodium hydroxide. The particle diameter of the activated carbon is not limited, and is preferably 20 μm or less. The specific surface area is not limited, either, and is preferably about 800 m$^2$/g or more and 3000 m$^2$/g or less (more preferably 2000 m$^2$/g or more and 3000 m$^2$/g or less). When the specific surface area is set into this range, the capacitor can be made large in electrostatic capacity, and can be made small in internal resistance.

The conduction aid is not particularly limited in kind, and may be a known or commercially available conduction aid. Examples thereof include acetylene black, Ketjen Black, a carbon fiber, natural graphite (scaly graphite or earthy graphite), artificial graphite, and ruthenium oxide. Of these examples, acetylene black, Ketjen Black, a carbon fiber and others are preferred. Furthermore, it is preferred to mix acetylene black or Ketjen Black with a carbon fiber, and it is preferred about the blend ratio therebetween that the proportion of the carbon fiber is 20% by mass or less of the whole of the conduction aid. This manner makes it possible to improve the electroconductivity of the capacitor. The content of the conduction aid is not limited, and is preferably about 0.1 parts by mass or more and 10 parts by mass or less for 100 parts by mass of the activated carbon. If the content is under 0.1 parts by mass, the electroconductivity-improving effect is small. If the content is more than 10 parts by mass, the electrostatic capacity may be lowered.

The binder is not particularly limited in kind, and may be a known or commercially available binder. Examples thereof include polyvinylidene fluoride, polytetrafluoroethylene, polyvinylpyrrolidone, polyvinyl chloride, polyolefin, styrene/butadiene rubber, polyvinyl alcohol, carboxymethylcellulose, and xanthan gum. It is advisable to select the binder in accordance with the solvent to be used. When N-methyl-2-pyrrolidone is used as the solvent, polyvinylidene fluoride is preferred. When water is used as the solvent, preferred is a mixture of polytetrafluoroethylene and carboxymethylcellulose. These combinations make it possible to control the internal resistance of the capacitor into a low value, and give a large electrostatic capacity. The content of this binder is preferably 0.5 parts by mass or more and 10 parts by mass or less for 100 parts by mass of the activated carbon. If the binder content is less than 0.5 parts by mass, the current collector cannot hold the activated carbon so that the capacitor becomes small in capacity or lifespan. If the binder content is more than 10 parts by mass, the function of the activated carbon is hindered so that the capacity becomes small. The content is more preferably 1 part by mass or more and 5 parts by mass or less.

<<Electrolyte Layer>>

The electrolyte layer 30 formed on the positive electrode 10 is a layer for insulating the positive electrode 10 and the negative electrode 20 electrically from each other. This electrolyte layer 30 may a layer containing a solid electrolyte, or a layer made of a combination of a Li-salt-containing electrolytic solution with a separator.

[Solid Electrolyte Layer]

Characteristics required for solid electrolytes are low electron-conducting performance, and excellent electrolyte-ion-conducting performance. For example, a sulfide such as $Li_2S$—$P_2S_5$ may be used. The solid electrolyte which constitutes the electrolyte layer 30 is preferably made identical in material with the solid electrolyte of the positive electrode 10. In this case, the resistance against the mobility of the electrolyte ions is uniform in the whole of the capacitor 100; thus, performance such as the responsiveness of the capacitor 100 can be improved.

The thickness of the electrolyte layer 30 is preferably set into the range of about 1 to 100 μm. When the thickness is smaller, the capacity can be made higher. However, if the thickness is too small, short circuit is easily caused between the electrodes. In the case of the capacitor 100, in accordance with the thickness of the electrolyte layer 30 that corresponds to the distance between the electrodes, the capacity of the capacitor 100 is varied. Thus, it is advisable to decide the thickness of the electrolyte layer 30 correspondingly to the usage of the capacitor 100.

The electrolyte layer 30 described above may be formed by a physical gas phase method such as a laser ablation method or a vacuum vapor deposition. The electrolyte layer 30 may be formed by pressing a powder of a solid electrolyte to be hardened. When the electrolyte layer 30 is formed by the gas phase method, it is advisable in the case of making the solid electrolyte constituting the electrolyte layer 30 identical with that contained in the positive electrode 10 that the film of the positive electrode 10 is formed and subsequently the film of the electrolyte layer 30 is formed. In this case, it is advisable to stop the evaporation of the conductive substance when the thickness of the positive electrode 10 is turned into a desired value, and then continue the evaporation of the solid electrolyte.

[Electrolytic Solution and Separator]

In the meantime, in the case of the electrolyte layer 30 that is made of a combination of an electrolytic solution and a separator, an aqueous electrolytic solution and a nonaqueous electrolytic solution may each be used. A nonaqueous electrolytic solution is particularly preferred since the solution makes it possible to set the voltage into a high value. In the aqueous system, potassium hydroxide or some other may be used as the electrolyte therein. As the nonaqueous electrolyte, many combinations of a cation with an anion are known. The cation may be a lower aliphatic quaternary ammonium, a lower aliphatic quaternary phosphonium, an imidazolinium, or some other. The anion may be tetrafluoroborate, hexafluorophosphate, or some other. The solvent of such an organic electrolytic solution is a polar aprotonic organic solvent. Specifically, the following may be used: ethylene carbonate, propylene carbonate, γ-butyrolactone, sulfolane, and others. Of the above-mentioned combinations, preferred is a combination of tetraethyl ammonium borofluoride with propylene carbonate, which is a combination low in ion conductivity.

<<Negative Electrode>>

The negative electrode 20 used in the present embodiment may have the same structure as the positive electrode 10. In the case of using, for example, a sulfide solid electrolyte common to members extending from the negative electrode 20 to the positive electrode 10 through the electrolyte layer 30, performance such as the responsiveness of the capacitor 100 can be improved. The negative electrode 20 may be formed from a material different from the material of the positive electrode 10 under conditions different from those for forming the positive electrode 10.

The negative electrode 20 may be rendered a Faraday electrode (electrode wherein electric charges are accumulated by chemical reaction), which is entirely different in structure from polarizable electrodes, such as the positive electrode 10. In this case, the capacitor 100 is a hybrid capacitor, which has the polarizable electrode and the Faraday electrode.

[Negative Electrode Using Metallic Porous Body as Collector]

An example of the Faraday electrode has a structure having a porous metal for the negative electrode, and an electrode material for the negative electrode that is capable of adsorbing and releasing Li ions and is held in the negative electrode porous metal. The negative electrode porous metal may be a Ni porous body, which will be described hereinafter. The Ni porous body is unsuitable for a current collector for the positive electrode 10 in the capacitor 100 using a nonaqueous electrolytic solution from the viewpoint of corrosion resistance; however, the Ni porous body may be used for the negative electrode 20.

As the Ni porous body, a structural body having continuous pores, such as a Ni foam or a Ni fiber nonwoven fabric, may be preferably used. Since the porous body is used in the state that an active material is filled in spaces in the porous body, it is better that the porosity is higher. The porosity is preferably 80% or more and 98% or less.

(Ni Foam)

The Ni foam is obtained by forming a Ni coat layer on the surface of a foamed resin, removing the resin as a base material, and then optionally treating the workpiece thermally in a reducing atmosphere to reduce the Ni.

The foamed resin may be any resin that has porosity, and may be a known or commercially available foamed resin. Examples thereof include a urethane foam and a styrene foam. Of these examples, a urethane foam is preferred since the porosity is particularly large.

The porosity of the foamed resin is usually about 80% or more and 97% or less, preferably about 90% or more and 96% or less. The average pore diameter is usually about 200 μm or more and 800 μm or less, preferably about 300 μm or more and 600 µm or less. The thickness of the foamed resin is appropriately decided in accordance with the usage of the capacitor, and others. It is advisable to set the thickness usually into the range of about 200 µm or more and 3000 µm or less, preferably into that of about 300 µm or more and 1500 µm or less, more preferably into that of about 400 µm or more and 1200 µm or less.

In order to form a Ni coat layer on the surface of the foamed resin, a known Ni coating method may be adopted. Examples thereof include an electroplating method, an electroless plating method, and a sputtering method. These coating methods may be used alone or in combination of two or more thereof. From the viewpoint of productivity and costs, it is preferred to adopt a method of subjecting the foamed resin surface to an electrically conducting treatment by an electroless plating method or a sputtering method, and then plating the workpiece with Ni by an electroplating method until the plating gives a desired deposit amount.

The electrically conducting treatment is not restrictive as far as the treatment makes it possible to lay a conductive layer on the surface of the foamed resin. Examples of the material that constitutes the conductive layer (conductive coat layer) include metals such as Ni, titanium, and stainless steel, and graphite. Of these examples, Ni is particularly preferred. In the case of using, for example, Ni, preferred and specific examples of the electrically conducting treatment include an electroless plating treatment and a sputtering treatment. In the case of using titanium, stainless steel or some other metal, graphite, or some other material, a preferred example thereof is a treatment of adding a binder to a fine powder of this material, and then painting the resultant mixture onto the foamed resin.

For the electroless plating treatment using Ni, it is advisable, for example, to immerse the foamed resin in a known electroless Ni plating bath, such as an aqueous Ni sulfate solution containing sodium hypophosphite as a reducing agent. If necessary, before the immersion into the plating bath, the foamed resin may be immersed in an activating liquid containing a very small amount of palladium ions (washing liquid manufactured by KANIGEN Co., Ltd.), or some other liquid. For the sputtering treatment using Ni, it is advisable, for example, to attach a foamed resin to a substrate holder, and then apply a DC voltage to the holder and a target (Ni) across them while an inert gas is introduced thereto, thereby colliding the resultant ionized inert gas with the Ni to deposit the sputtered Ni particles onto the surface of the foamed resin.

When the thickness of the Ni plating film is increased by the electroless plating treatment and/or the sputtering treatment, no electroplating treatment is required. However, from the viewpoint of productivity and costs, it is preferred to adopt a method of subjecting the foamed resin initially to an electrically conducting treatment, and then forming a Ni plating layer thereon by an electroplating method, as described above.

It is advisable to conduct the Ni electroplating treatment in an ordinary manner. The foamed resin on the surface of which the conductive layer is formed by the electroless plating or sputtering is immersed in a plating bath; the foamed resin and a Ni counter plate are connected to the negative electrode and the positive electrode, respectively; and then a direct current or an intermittent pulse current is passed thereto, whereby a Ni coat can be formed on the conductive layer. The plating bath used for the Ni electroplating treatment may be a known or commercially available bath, and is, for example, a watt bath, a chloride bath, or a sulfamic acid bath.

The respective deposit amounts of the conductive coat layer and the electroplating layer are not particularly limited. The conductive coat layer needs only to be continuously formed on the surface of the foamed resin, and the Ni electroplating layer needs only to be formed on the conductive coat layer in such a degree that the conductive coat layer is not exposed.

The deposit amount of the conductive coat layer is not limited, and it is advisable to set the amount usually into the range of about 5 $g/m^2$ or more and 15 $g/m^2$ or less, preferably into that of about 7 $g/m^2$ or more and 10 $g/m^2$ or less. The deposit amount of the Ni electroplating layer is not limited, and it is advisable to set the amount usually into the range of about 150 $g/m^2$ or more and 600 $g/m^2$ or less, preferably into that of about 200 $g/m^2$ or more and 450 $g/m^2$ or less.

The total amount of the deposit amounts of the conductive coat layer and the Ni electroplating layer is preferably 200 $g/m^2$ or more and 600 $g/m^2$ or less. If the total amount is below this range, the current collector may be deteriorated in strength. If the total amount is over this range, the filling amount of the polarizable material is decreased and further a disadvantage is caused for costs.

Next, the foamed resin component is removed from the conductive-coat-layer/Ni-plating-layer formed foamed resin yielded as described above. The method for the removal is not limited. Preferably, the component is removed by burning the resin. Specifically, it is advisable to heat the resin in an oxidizing atmosphere, for example, the atmospheric air having a temperature of about 600° C. or higher. The resin may be heated to about 750° C. or higher in a reducing atmosphere, such as hydrogen. This manner makes it possible to yield a porous metal composed of the conductive coat layer and the Ni electroplating layer. The resultant porous body is subjected to a thermal treatment in a reducing atmosphere to reduce the Ni, thereby yielding a Ni foam.

(Ni Nonwoven Fabric)

A Ni nonwoven fabric is yielded by forming a Ni coat layer onto a surface of a resin nonwoven fabric, removing the resin as a base material, and then subjecting the workpiece optionally to a thermal treatment in a reducing atmosphere to reduce the Ni.

The porous resin nonwoven fabric used in the present invention may be a known or commercially available fabric, and is preferably a thermoplastic resin. An example thereof is a fiber made of an olefin homopolymer, such as polyethylene, polypropylene or polybutene, a fiber made of an olefin copolymer, such as an ethylene/propylene copolymer, an ethylene/butene copolymer, or a propylene/butene copolymer, or a mixture of these fibers. The molecular weight and the density of the polyolefin resin constituting the polyolefin resin fiber are not particularly limited. It is advisable to decide these properties appropriately in accordance with the kind of the polyolefin resin, and others. A core/sheath type fiber composed of two components different from each other in melting point may be used.

A specific example of the core/sheath type composite fiber is a core/sheath type fiber containing, as a core component thereof, polypropylene and containing, as a sheath component thereof, polyethylene. In this case, the blend ratio (ratio by mass) of the polypropylene resin to the polyethylene resin is usually from about 20/80 to 80/20, preferably from about 40/60 to 70/30.

It is advisable to set the average fiber diameter of the resin fiber usually into the range of about 9 µm or more and 70 µm or less, preferably into that of about 10 µm or more and 50 µm or less. The average fiber length is not limited, either, and it is advisable to set the length usually into the range of about 5 mm or more and 100 mm or less, preferably into that of about 30 mm or more and 70 mm or less. The porosity of the nonwoven fabric is usually about 80% or more and 97% or less, preferably about 86% or more and 96% or less. When the porosity is set into this range, the resin nonwoven fabric makes it possible to keep strength for a polarizable electrode while a large volume of activated carbon is filled into the nonwoven-fabric-form current collector so that the capacitor can be made high in power and capacity.

The pore diameter of the nonwoven fabric is usually about 200 μm or more and 800 μm or less, preferably about 300 μm or more and 600 μm or less. The pore diameter is a value measured by the bubble point method. It is advisable to decide the average thickness of the nonwoven fabric in accordance with the usage and the purpose of the capacitor to be produced, and others, and set the thickness usually into the range of about 200 μm or more and 3000 μm or less, preferably into that of about 300 μm or more and 1500 μm or less, more preferably into that of about 400 μm or more and 1200 μm or less.

The nonwoven fabric may be subjected to a pretreatment, such as a needle punch method, a water current entangling method or some other entangling treatment, or a thermal treatment at a temperature near the softening temperature of the resin fiber, before subjected to the plating treatment. This pretreatment makes it possible to strengthen the bonding between the fibers to improve the strength of the nonwoven fabric, thereby keeping sufficiently a three-dimensional structure necessary when activated carbon is filled into the nonwoven fabric.

Any nonwoven fabric is usually produced through a known dry method or wet method. In the present invention, the nonwoven fabric may be produced through either one of the methods. Examples of the dry method include the carding method, the air laying method, the melt blowing method, and the spunbonding method. Examples of the wet method include a method of dispersing single fibers in water, and straining the dispersion onto a net. In the present invention, it is preferred to use a nonwoven fabric obtained through the wet method since the method permits the production of a current collector that is small in the unevenness of deposit amount and thickness, and is even in thickness.

In order to form the Ni coat layer onto the resin nonwoven fabric surface, a known Ni coating method may be adopted in the same manner as in the case of the above-mentioned foamed resin. Specific examples thereof include an electroplating method, an electroless plating method, and a sputtering method. These coating methods may be used alone or in combination of two or more thereof. In the same manner as in the case of the foamed resin, it is preferred to adopt a method of subjecting the resin nonwoven fabric surface to an electrically conducting treatment, and then plating this workpiece with Ni by an electroplating method until the plating gives a desired deposit amount.

For the electrically conducting treatment, the same method as used in the case of the foamed resin may be adopted. When a sputtering treatment is conducted as the electrically conducting treatment, it is preferred to conduct the treatment at a temperature at which the resin nonwoven fabric is not molten. Specifically, it is advisable to conduct the treatment at a temperature of about 100° C. or more and 200° C. or less, preferably about 120° C. or more and 180° C. or less.

The deposit amount of the conductive coat layer needs only to be made into a degree that electroconductivity can be given to the nonwoven fabric. It is advisable to set the deposit amount, for example, into the range of about 5 g/m$^2$ or more and 15 g/m$^2$ or less, preferably into that of about 7 g/m$^2$ or more and 10 g/m$^2$ or less.

It is advisable to conduct the Ni electroplating treatment in an ordinary manner in the same way as in the case of the foamed resin. It is advisable to set the deposit amount of the Ni electroplating layer on the nonwoven fabric into the range of about 150 g/m$^2$ or more and 600 g/m$^2$ or less, preferably into that of about 200 g/m$^2$ or more and 450 g/m$^2$ or less from the viewpoint of the electroconductivity, the porosity, the strength, the corrosion resistance, economical efficiency, and others. If the total amount is below this range, the current collector may be deteriorated in strength. If the total amount is over this range, the filling amount of the polarizable material is decreased or a disadvantage is caused for costs.

The treatment for removing the resin nonwoven fabric can also be conducted in the same manner as in the case of the foamed resin. Specifically, it is advisable to heat the nonwoven fabric to be burned off. The resultant nonwoven fabric porous body is subjected to a thermal treatment in a reducing atmosphere to reduce the Ni, thereby yielding a Ni foam.

The average thickness of the current collector is usually about 200 μm or more and 3000 μm or less, preferably about 300 μm or more and 1500 μm or less, more preferably about 400 μm or more and 1200 μm or less.

(Electrode Material for Negative Electrode)

The negative electrode active material is obtained by mixing a metal powder capable of adsorbing and releasing lithium ions with a solvent, and then stirring the mixture by a mixer. The material may optionally contain a conduction aid and a binder.

In the present invention, a metal that can be alloyed with lithium is filled into the negative electrode. This metal is larger in capacity than any conventional graphite material; thus, the use amount thereof can be decreased. For this reason, the capacitor according to the present invention makes it possible to make the negative electrode thin to decrease the volume of the cell. Thus, the capacitor can be improved in volume energy density.

The metal capable of adsorbing and releasing lithium ions is not particularly limited as far as the metal can adsorb and release lithium ions. Examples thereof include Al, Sn and Si. The metal is preferably an alloy or composite containing 20% by mass or more of at least one of Al, Sn and Si, and is in particular preferably a metal having a theoretical capacity of 300 mAh/g or more. Preferred examples of the composite include an Al—Ni alloy, a copper/tin alloy wherein Cu and Sn are mixed with each other (Sn: 10% by mass or more and 70% by mass or less), and a composite wherein a silicon powder and a silica powder are compounded with each other.

[Negative Electrode Using Metal Foil as Collector]

Another example of the Faraday electrode may be made into a structure having a metal foil, and an electrode material, for the negative electrode, that is painted on any surface of the metal foil and is capable of adsorbing and releasing Li ions. In this case, the metal foil functions as the current collector of the negative electrode.

The negative electrode may be formed by painting, onto the negative electrode current collector made of the metal foil and others, a negative electrode active material made mainly of a carbon material capable of adsorbing and releasing Li ions. The method for painting the negative electrode active material may be, for example, a method of making the carbon material into a pasty form, and painting the negative electrode active material paste by a doctor blade method or some other method. If necessary, the resultant may be dried and then subjected to pressure forming by a roller press machine or some other.

For the metal foil, for example, Al, Cu, Ni or stainless steel may be used. The negative electrode electrode material is obtained by mixing a carbon material capable of adsorbing and releasing Li ions with a solvent, and stirring the mixture by a mixer. If necessary, the electrode material may contain a conduction aid, and a binder. The conduction aid and the binder may be the same as described above.

The carbon material is not particularly limited as far as the material can adsorb and release Li ions. The material is, for example, a graphite material or an easily-graphitizable carbon material. The carbon material is preferably a material having a theoretical capacity of 300 mAh/g or more. Into this carbon material are adsorbed Li ions. The method for adsorbing the Li ions into the carbon material is, for example, a method of bonding a Li foil onto the negative electrode formed through the above-mentioned step under pressure, and warming the produced capacitor in a thermostat of 60° C. for 24 hours. Other examples thereof include a method of mixing the carbon material with a Li material, and kneading the mixture through a mechanical alloy method, and a method of integrating metallic Li into the cell of the capacitor, and short-circuiting the negative electrode and the metallic Li with each other.

In the case of using the negative electrode formed by filling the negative electrode electrode material into the porous metal, or the negative electrode formed by painting the negative electrode electrode material onto the metal foil, it is preferred to make the negative electrode capacity larger than the positive electrode capacity in the capacitor, and set the Li-adsorbing amount to 90% or less of the difference between the positive electrode capacity and the negative electrode capacity, that is, cause the following expression to be satisfied: ["the negative electrode capacity"–"the positive electrode capacity"]×0.9>"the Li-adsorbing amount of the negative electrode". The Li-adsorbing amount of the negative electrode means the charge capacity of the negative electrode, i.e., "the electric current that has been caused to flow for the adsorption of Li"×"the period". When the negative electrode capacity is made large to manage the Li-adsorbing amount in this way, short circuit based on the growth of dendrites of Li can be prevented.

<<Conclusion>>

The capacitor 100 produced as described above has the Al porous body 11, which has a large current collector area and hardly has a high-resistance oxide layer formed, so that the capacitor 100 has a larger capacity than conventional capacitors. As a result, the capacitor 100 can be favorably used for various articles, such as a backup power source for electrical equipment.

EXAMPLES

Test Example 1

An Al porous 11 as described in the above-mentioned embodiment, and a conventional Al porous body for comparison were produced, and each of the porous bodies was used to produce a capacitor 100 as illustrated in FIG. 1. The capacities (F) of these capacitors 100 were actually measured.

Formation of Al Porous Body of Embodiment

As illustrated in FIG. 2(A), the following was prepared as a resin body 1f: a polyurethane foam (foamed urethane) having a porosity of about 97%, a pore diameter of about 15 μm, and a thickness of about 0.1 mm.

Next, pure Al was molten and evaporated by a vacuum vapor deposition to form an Al layer 2 on the resin surface of the resin body 1f (see FIG. 2(B)). The vacuum deposition was performed in the state that: the vacuum degree was set to $10 \times 10^{-5}$ Pa; the temperature of the resin body 1f as an object to be coated, to room temperature; and the distance between the evaporation source and the resin body 1f, to 300 mm. After the formation of the Al layer 2 on the resin surface of the resin body 1f, the resin body 1f on the resin surface of which the Al layer 2 was formed (the Al-layer-coated resin body 3) was observed by means of an SEM. As a result, the thickness of the Al layer 2 was 3 μm.

Figure 3:
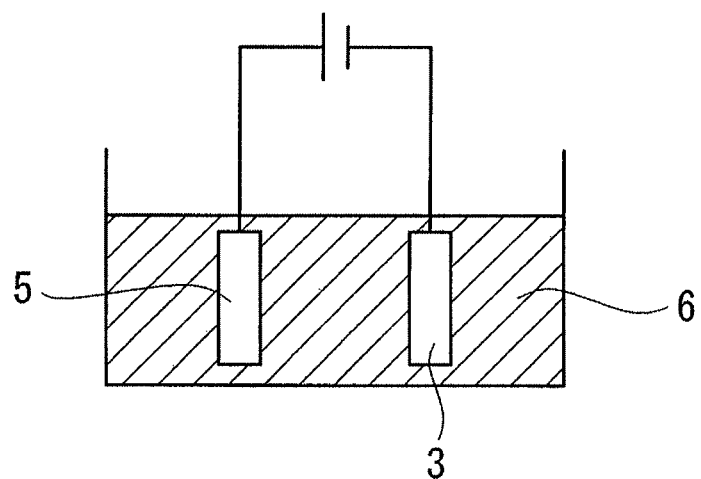
FIG. 3 is a schematic view referred to in order to describe the step of decomposing the resin body thermally in a molten salt.

Next, as illustrated in FIG. 3, the Al-layer-coated resin body 3 was immersed in a eutectic molten salt 6 made of LiCl and KCl and having a temperature of 500° C., and further in this state a negative voltage was applied to the Al layer for 30 minutes to make the potential of the Al layer one voltage lower than the standard electrode potential of Al. At this time, it was recognized that air bubbles were generated in the molten salt 6. It is presumed that this resulted from thermal decomposition of the polyurethane.

Next, the skeleton yielded through the above-mentioned steps and made of Al (Al porous body), wherein the resin body had been thermally decomposed, was cooled to room temperature in the atmosphere, and then washed with water to remove any molten salt adhering onto the surface. In this way, the Al porous body 11 was made complete (see FIG. 2(C)).

The formed Al porous body 11 had a porosity of 95%, a pore diameter of 15 μm, and a thickness of 0.1 mm. This Al porous body 11 was observed by an SEM. As a result, the pores were continuous to each other, and closed pores were not observed. Furthermore, the surface of this Al porous body 11 was quantitatively analyzed by EDX at an accelerating voltage of 15 kV. As a result, no oxygen peak was observed. In short, no oxygen was detected. Accordingly, the oxygen content in the surface of the Al porous body 11 was equal to or less than the detection limit thereof through EDX, that is, 3.1% by mass or less. The apparatus used for the analysis was an apparatus "EDAX Phoenix, model No.: HIT22 136-2.5" manufactured by EDAX Inc.

(Formation of Al Porous Body for Comparison)

For comparison, formed was an Al porous body different in production method from the Al porous body of the embodiment. About this comparative Al porous body, the same production method as used to produce the Al porous body of the embodiment was performed up to the formation of an Al layer onto the resin surface of a resin body, thereby producing an Al-layer-coated resin body. A subsequent step of decomposing the resin body thermally was changed to form the comparative Al porous body. Specifically, the Al-layer-coated resin body was thermally treated in the atmosphere at 550° C., thereby decomposing the resin body thermally to remove the resin. This comparative Al porous body had a porosity of 95%, a pore diameter of 15 μm, and a thickness of 0.1 mm.

The surface of the comparative Al porous body was quantitatively analyzed by EDX at an accelerating voltage of 15 kV. As a result, an oxygen peak was observed, and the oxygen content in the surface was more than 3.1% by mass. It is presumed that this resulted from the matter that the surface of the Al porous body was oxidized when the resin body was thermally treated.

(Production of Capacitor)

Next, either one of the Al porous body 11 of the embodiment and the comparative Al porous body formed was used to produce a capacitor 100 as illustrated in FIG. 1(A), which had a thin-film electrode material 12 as illustrated in FIG. 1(B), or a capacitor 100 having a filled electrode material 13 as illustrated in FIG. 1(C).

The capacitor 100 in FIG. 1(A), which had the electrode material 12 illustrated in FIG. 1(B), was produced as follows:

The Al porous body of the embodiment or the comparative Al porous body was first prepared, and the electrode material 12 was made into a film form in the pores in the Al porous body by a laser ablation method to form a positive electrode 10. Conditions for the laser ablation method were as follows:

Electrolyte material: $Li_2S$—$P_2S_5$ pressure-formed material (diameter: 20 mm, and thickness: 5 mm), Conductive fine particle material: C sintered body (diameter: 20 mm, and thickness: 5 mm), Distance from the $Li_2S$—$P_2S_5$ pressure-formed material and the C sintered body to the Al foil (substrate): 50 mm, Film-forming atmosphere: Ar, and Film-forming pressure: $10^{-1}$ Pa.

The formation of the electrode was attained by irradiating the electrolyte material and the conductive fine particle material alternately with a laser. For example, the irradiation of the electrolyte material with the laser for 10 seconds and that of the conductive fine particle material therewith for 10 seconds were alternately repeated to form the electrode material into a predetermined thickness.

A cross section of the formed electrode was observed through an electron microscope. As a result, the section was in a state that C particles were substantially evenly dispersed in a matrix of $Li_2S$—$P_2S_5$. The average particle diameter of the C particles was about 10 nm. The average particle diameter was obtained by calculating the respective circuit equivalent diameters of 100 or more of the C particles, in the viewing field of the microscope, from the respective areas of the individual particles, and then averaging the obtained values.

Next, a laser was radiated only onto the electrolyte material on the electrode to form an electrolyte layer 30. Finally, the electrolyte material and the conductive fine particles were alternately irradiated with the laser to form a negative electrode 20.

Each of the electrodes 10 and 20: a diameter of 10 mm, and a thickness of 5 μm, and Electrolyte layer 30: a diameter of 10 mm, and a thickness of 1 μm.

An Al electrode was formed on the negative electrode 20 by a vacuum vapor deposition to have a thickness of 0.1 μm, thereby forming a current collector. The Al porous body, which was the base material, was used as a current collector of the positive electrode 10, and the workpiece was sealed into a heat-resistant coin type case. In this way, the capacitor element was made complete.

In the meantime, the capacitor 100 in FIG. 1(A), which had the electrode material 13 illustrated in FIG. 1(C), was produced as described below. Its positive electrode 10 and its negative electrode 20 were made to have the very same structure.

The Al porous body of the embodiment or the comparative Al porous body was first prepared. Into the pores in the Al porous body was filled a mixed material of a solid electrolyte powder having an average particle diameter of 0.5 μm and acetylene black having an average particle diameter of 0.05 μm. The blend ratio by mass of the solid electrolyte powder to the acetylene black was 50:50. The mixing of the two was attained by use of a planetary ball mill.

Next, the Al porous body, wherein the mixed material was filled into the pores, was pressed at 500 MPa to form the electrode 10 (20), which was made of the Al porous body and the electrode material composed of carbon and the solid electrolyte. At this time, the thickness of the electrode 10 (20) was 0.05 mm, and the compression ratio ("the thickness after the pressing"/"the thickness before the pressing") was 50%.

Furthermore, the formed electrode 10, the solid electrolyte powder, and the other electrode 20 were successively arranged inside a mold having a diameter of 10 mm, and these components were subjected to pressure forming at a pressure of 500 MPa to complete a capacitor element composed of the positive electrode 10, the electrolyte layer 30, and the negative electrode 20. The solid electrolyte powder for forming the electrolyte layer 30 was $Li_2S$—$P_2S_5$, which was the same as used for the electrodes 10 and 20. The respective sizes of the individual layers of the completed capacitor were as follows:

Each of the electrodes 10 and 20: a diameter of 10 mm, and a thickness of 0.05 mm, and Electrolyte layer 30: a diameter of 10 mm, and a thickness of 0.05 mm.

The finally produced capacitor element was sealed into a heat-resistant coin type case so that the capacitor 100 was made complete.

About each of the four types of capacitors 100 produced as described above, the capacity thereof was measured from the voltage value and the current value when electricity was accumulated into the capacitor 100. The results are shown in Table 1.

TABLE 1

| Sample No. | Electrode body type | Al porous body type | Oxygen content in Al porous body surface (%) | Capacity (F) |
| --- | --- | --- | --- | --- |
| 1 | Thin film type | Embodiment type | 3.1 or less | $1.2 \times 10^{-1}$ |
| 2 | Thin film type | Comparative type | More than 3.1 | $5 \times 10^{-2}$ |
| 3 | Filling type | Embodiment type | 3.1 or less | $4 \times 10^{-4}$ |
| 4 | Filling type | Comparative type | More than 3.1 | $2 \times 10^{-4}$ |

As shown in Table 1, in each of the capacitor 100 having the electrode material 12 of the type illustrated in FIG. 1(B), and the capacitor 100 having the electrode material 13 of the type illustrated in FIG. 1(C), it was recognized that the capacity of the capacitor 100 was improved by setting the oxygen content in the surface of the Al porous body 11, which was to be a current collector, to 3.1% by mass or less. It is presumed that the reason therefor was as follows: when the oxygen content was small in the surface of the Al porous body 11, that is, when no oxide film was formed on the surface of the Al porous body 11, the electrical resistance between the Al porous body 11 and the electrode material 12 (13) became small.

Test Example 2

Three types of electrodes A to C described below were formed, and then some combinations from the electrodes were each used to produce a capacitor. The produced capacitors were evaluated about the electrostatic capacity and the endurance thereof.

<<Electrodes A>>

(Formation of Collectors)

As foamed resins, prepared were polyurethane foams having a porosity of 97% and a pore diameter of about 300 μm.

The foams were each cut into pieces of 20 mm square. Al was evaporated and deposited onto any surface of each of the polyurethane foams to form an Al layer of 15 μm thickness.

Subsequently, the foamed resin on which the Al layer was formed was immersed in a eutectic molten salt of LiCl and KCl of 500° C., and then a negative voltage of −1 V was applied thereto for 30 minutes. Air bubbles were generated in the molten salt. Thus, it is presumed that a decomposition reaction of the polyurethane was caused. Thereafter, the system was cooled to room temperature in the atmosphere, and the foamed resin was washed with water to remove the molten salt. In this way, each Al porous body was yielded. The body was measured by ICP, and the result demonstrated that the Al content in the Al porous body was 99% by mass or more. The resultant Al porous body had a pore diameter of 300 μm, a thickness of 1.4 mm and a porosity of 97%. This was used as a current collector a. The method for forming this current collector (Al porous body) a was substantially equivalent to that for forming the Al porous body of Test Example 1; thus, it is presumed that the oxygen content in the surface of this current collector a was 3.1% by mass or less.

(Formation of Electrodes)

The width of a gap in a roller press was adjusted into 700 μm, and each of the resultant current collectors a was passed therethrough to yield a current collector of 0.72 mm thickness.

An activated carbon paste was prepared by adding, to 22% by mass of an activated carbon powder (specific surface area: 2500 m²/g, and average particle diameter: about 5 μm), 1% by mass of Ketjen Black as a conduction aid, 2% by mass of a polyvinylidene fluoride powder as a binder, and 75% by mass of N-methylpyrrolidone as a solvent, and then stirring the components in a mixer. The paste was dried to remove NMP. After the removal, the composition ratio was as follows: the activated carbon powder: 92% by mass; Ketjen Black: 3% by mass; and the polyvinylidene fluoride powder: 5% by mass.

This activated carbon paste was filled into each of the current collectors a to set the content of the activated carbon to 30 mg/cm². The filling amount thereof was actually 30 mg/cm². Next, the current collector was dried at 200° C. in a drying machine for 1 hour to remove the solvent, and then the workpiece was pressed by a roller press machine of 500 mm diameter (gap width: 300 μm). Thus, each electrode A was yielded. After the pressing, the thickness thereof was 470 μm.

<<Electrodes B>>

As current collectors, Al foil pieces (commercially available, thickness: 20 μm) were used. The same activated carbon paste as prepared to form the electrodes A was painted onto each of the pieces by a doctor blade method to give a two-surface total amount of 8 mg/cm². However, the strength for the bonding was insufficient, so that the active material was unable to be bonded to the Al foil piece.

Thus, produced was the same activated carbon paste as prepared to form the electrodes A except that the content of polyvinylidene fluoride was adjusted to 20% by mass after the paste was dried. This paste was painted onto both surfaces of each of the Al foil pieces by a doctor blade method. The workpiece was then dried and pressed. In this way, each electrode B was formed. The amount of the painted activated carbon was 8 mg/cm², and the thickness of the electrodes was 162 μm.

<<Electrodes C>>

As current collectors, use was made of Ni foams (commercially available, Ni deposit amount: 400 g/m², porosity: 96% by volume, pore diameter: 450 μm, and thickness: 1.4 mm). In the same way as in the case of the electrodes A, into each of these Ni foams was filled the same activated carbon paste as prepared to form the electrodes A. Thereafter, the foam was further pressed and dried. In this way, each electrode C of Comparative Example 2 was formed. The filling amount of the activated carbon was 29 mg/cm², and the thickness of the electrodes was 475 μm after the pressing.

<<Production and Tests of Capacitors>>

The electrodes A, as well as electrodes B and C, were each punched out into a diameter of 14 mm (two pieces), and a separator made of a cellulose fiber (thickness: 60 μm, density: 450 mg/cm³, and porosity: 70%) was sandwiched therebetween to oppose these electrodes to each other. In this state, the workpiece was dried at 180° C. under reduced pressure for 12 hours. Thereafter, a spacer made of stainless steel was used to package the workpiece into a coin type cell case having an R2032 size. The electrodes and the separator were impregnated with a nonaqueous electrolytic solution, i.e., a solution wherein tetraethylammonium borofluoride was dissolved in propylene carbonate to give a concentration of 1 mol/L. Furthermore, a case cap was fastened to interpose an insulating gasket made from propylene therebetween, thereby closing the opening. Thus, coin type electric double layer capacitors AA, BB and CC for tests (corresponding to the electrodes A, B and C, respectively) were produced. The respective rated voltages thereof were set to 2.5 V.

A capacitor AC, wherein one of the electrodes A (Al porous bodies) and one of the electrodes C (Ni porous bodies) were used as its positive electrode and its negative electrode, respectively, was produced in the same way as used to produce the capacitors AA to CC.

<<Evaluation of Electrostatic Capacities>>

In addition to the capacitor AA, separately, the same capacitors the number of which was nine were formed, as well as in addition to each of the capacitors BB, CC, and AC. A voltage of 2.5 V was applied to each of these capacitors at 65° C. for 6 hours to be aged. The temperature was then set to 25° C., and under a condition that a starting voltage of 2.5 V was used, the capacitor was discharged at a current of 1 mA to examine the initial electrostatic capacity and the internal resistance. In Table 2 are shown the respective averages of the electrostatic capacities per unit area, and the electrostatic capacities and the internal resistances per unit volume. About the capacitors CC, the voltage after the ageing did not reach 2.5 V in any one of the ten cells, and the discharging was able to be continued only in a very short period. Thus, the respective electrostatic capacities and the respective internal resistances were not measured.

TABLE 2

| Capacitor | Electrostatic capacity (F/cm²) | Capacity per unit volume (F/cm³) | Internal resistance per electrode area (Ω · cm²) |
| --- | --- | --- | --- |
| AA | 0.86 | 16.2 | 15.1 |
| AC | 0.85 | 16.1 | 14.9 |
| BB | 0.16 | 12.8 | 32.0 |
| CC | Unable to be measured | Unable to be measured | Unable to be measured |

As is evident from Table 2, in the capacitors AA and AC, the capacity per unit volume was larger and the internal resistance was smaller than in the capacitors BB each using the Al foil. The reason therefor appears to be as follows: the porous bodies were used as current collectors, so that the filling amount of the activated carbon was made higher than in the case of using the Al foil; and further their respective skeletons were evenly dispersed in their respective electrodes to give excellent power collecting performance. When attention is paid, in particular, to the electrostatic capacities, the capacitors AA and AC exhibited electrostatic capacities about 5 times those of the capacitors BB. Thus, it is understood that in order that the capacitor of the present invention can gain an electrostatic capacity equivalent to that of the conventional capacitors represented as the capacitors BB, the area of the capacitor of the present invention (in particular, that of the polarizable electrode regions thereof) needs only to be ⅕ or less.

From the results of the capacitors CC, it is understood that even when the used current collectors are each a current collector having a porous structure, the current collector is unsuitable as a current collector when Ni lacking in electrolysis resistance and oxidation resistance is used in the positive electrode. However, in the case of using the Al porous body defined in the present invention for a positive electrode as in the capacitors AC, a Ni porous body may also be used for the negative electrode thereof. This appears to be because a high electrolysis resistance and oxidation resistance are necessary for only the positive electrode in light of a relationship of the voltage of the capacitor.

<<Endurance Test 1>>

Next, the capacitors were examined about the endurance thereof, which is important as a capacitor characteristic. When any capacitor is kept at a high voltage, the endurance thereagainst is important in a case where the capacitor is used for backup or some other. About the capacitors CC, the present test and a test described hereinafter were not made.

While a voltage of 2.5 V was applied to each of the capacitors at 65° C., the capacitor was kept as it was for 2000 hours. Thereafter, the temperature was set to 25° C., and then the electrostatic capacity, as well as the internal resistance, were measured to examine the rate of a change in the electrostatic capacity, as well as in the internal resistance, from the initial value. The results are shown in Table 3.

TABLE 3

| Capacitor | Electrostatic capacity (F/cm²) | | | Internal resistance (Ω · cm²) | |
|---|---|---|---|---|---|
| | Initial | After 2000 hours | Decrease percentage % | Initial | After 2000 hours |
| AA | 0.86 | 0.78 | 9.3 | 15.1 | 15.8 |
| AC | 0.85 | 0.77 | 9.4 | 14.9 | 15.6 |
| BB | 0.16 | 0.13 | 18.8 | 32.0 | 34.8 |

As is evident from Table 3, about the capacitors AA and AC, the change in the electrostatic capacity, as well as in the internal resistance, was smaller than about the capacitors BB even when the 2000 hours elapsed. It has been therefore understood that the electric double layer capacitor of the present invention can gain a high electrostatic capacity and exhibit excellent endurance. This appears to be because Al is incorporated into the capacitor, whereby the capacitor is improved in electrolysis resistance and oxidation resistance, and undergoes no corrosion even when it receives continuous application of a high voltage.

<<Endurance Test 2>>

In another endurance-evaluating method, the capacitors were each examined about the charge/discharge cycle life. The cycle life is an important index for representing the lifespan of the cell. Conditions therefor are as follows: at an atmosphere temperature of 45° C., between voltages from 0.5 to 2.5 V, a charge/discharge cycle at a constant current of 1 mA was repeated 10000 times. After the 10000 cycles, the discharge capacity and the internal resistance were measured, and then evaluated by comparing the values thereof with initial properties thereof, respectively.

As a result, the electrostatic-capacity-decrease percentage of the capacitors AA, and that of the capacitors AC were 9.3% and 9.4%, respectively, while that of the capacitors BB was 18.8%. The internal resistance of the capacitors AA and that of the capacitors AC were increased by 4.6% and 4.7%, respectively, while that of the capacitors BB was increased by 8.8%.

This appears to be because Al is incorporated into the capacitor of the present invention, whereby the capacitor is improved in electrolysis resistance and oxidation resistance, and further a porous body is used for its current collector, whereby activated carbon can be held in its skeleton so that the activated carbon can be prevented from being peeled by repeated charging and discharging.

Test Example 3

Three types of positive electrodes A to C, and negative electrodes A' described below were formed, and some combinations from these electrodes were used to produce capacitors AA', BA', CA', and AA. The produced capacitors were evaluated about the electrostatic capacity and the endurance thereof.

<<Capacitor AA'>>

(Formation of Positive Electrode A)

Prepared were the very same current collector a and active material paste as produced in Test Example 2. Next, the width of a gap in a roller press was adjusted to 700 μm, and the prepared current collector a was passed therethrough to yield a current collector of positive electrode of 0.72 mm thickness. An activated carbon paste was filled into the current collector a to set the content of the activated carbon to 30 mg/cm². The filling amount thereof was actually 31 mg/cm². Next, the current collector was dried at 200° C. in a drying machine for 1 hour to remove the solvent, and then the workpiece was pressed by a roller press machine of 500 mm diameter (gap width: 300 μm). Thus, a positive electrode A was yielded. After the pressing, the thickness thereof was 473 μm.

(Formation of Negative Electrode A')

A graphite-based negative electrode paste was prepared by adding, to 100 parts by weight of a natural graphite powder capable of adsorbing and releasing Li, 2 parts by weight of Ketjen Black (KB) as a conduction aid, 4 parts by weight of a polyvinylidene fluoride powder as a binder, and 15 parts by weight of N-methylpyrrolidone (NMP) as a solvent, and then stirring the components in a mixer.

A doctor blade (gap width: 400 μm) was used to paint this graphite-based negative electrode paste onto a Cu foil (negative electrode current collector) of 20 μm thickness. The paint amount thereof was actually 10 mg/cm². Next, the workpiece was dried at 100° C. in a drying machine for 1 hour to remove the solvent, and then pressed by a roller press machine of 500 mm diameter (gap width: 200 μm). Thus, an electrode A' was yielded. After the pressing, the thickness thereof was 220 μm.

(Formation of Capacitor AA')

The positive electrode A and the negative electrode A' were shifted to a drying room (dew point: −65° C.), and these were further dried at 180° C. under reduced pressure for 12 hours. The resultant positive electrode A and negative electrode A' were each punched into a diameter of 14 mm, and then a metallic Li foil of 15 μm thickness was bonded onto the negative electrode A' under pressure.

A separator made of polypropylene was sandwiched between the positive electrode and the Li-bonded surface of the negative electrode to oppose these electrodes to each other. In this way, a single-cell element was produced. A spacer made of stainless steel was used to package the element into a coin-shaped cell case having an R2032 size. An electrolytic solution was poured into the case to impregnate the electrodes and the separator therewith, this solution being an electrolytic solution wherein $LiPF_6$ was dissolved in ethylene carbonate (EC) and diethyl carbonate (DEC) mixed with each other at a ratio by volume of 1:1, so as to give a concentration of 1 mol/L.

Furthermore, a case cap was fastened to interpose an insulating gasket made from propylene therebetween, thereby closing the opening. In this way, a coin type capacitor AA' for tests was produced. Thereafter, the capacitor was allowed to stand still in a thermostat of 60° C. for 24 hours. By this operation, Li bonded to the negative electrode under the pressure was ionized to be adsorbed to the graphite of the negative electrode.

<<Capacitor BA'>>
(Formation of Positive Electrode B)

As a current collector of positive electrode, an Al foil (commercially available, thickness: 20 μm) was used. The same positive electrode active material as prepared to form the capacitor AA' was painted onto the piece by a doctor blade method to give a two-surface total amount of 8 $mg/cm^2$. However, the strength for the bonding was insufficient, so that the positive electrode active material was unable to be sufficiently bonded to the Al foil. Thus, produced was the same positive electrode active material paste as prepared to produce the capacitor AA' except that the content of polyvinylidene fluoride was adjusted to 20% by mass after the paste was dried. This paste was painted onto both surfaces of the Al foil by a doctor blade method. The workpiece was then dried and pressed to form a positive electrode B. The amount of the painted activated carbon was 8 $mg/cm^2$, and the thickness of the electrode was 180 μm.

(Production of Capacitor BA')

The positive electrode B and the negative electrode A' were used to make the same operation as in the production of the capacitor AA', thereby producing a capacitor BA'.

<<Capacitor CA'>>
(Formation of Positive Electrode C)

As a current collector of positive electrode, use was made of a Ni foam (commercially available, Ni deposit amount: 400 $g/m^2$, porosity: 96% by volume, pore diameter: 450 μm, and thickness: 1.4 mm). In the same way as in the case of the positive electrode A, a positive electrode C was formed. The filling amount of the activated carbon was 30 $mg/cm^2$, and the thickness of the positive electrode was 470 μm after the pressing.

(Production of Capacitor CA')

The positive electrode C and the negative electrode A' were used to make the same operation as in the production of the capacitor AA', thereby producing a capacitor CA'.

<<Production of Capacitor AA>>

Electrodes identical with the positive electrode A were used as a positive electrode and a negative electrode to make the same operation as in the production of the capacitor AA', thereby producing a capacitor AA. However, the electrolytic solution used therein was a solution wherein tetraethylammonium tetrafluoroborate was dissolved in propylene carbonate to give a concentration of 1 mol/L, and the used separator was a cellulose fiber separator (thickness: 60 μm, density: 450 $mg/cm^3$, and porosity: 70%).

<<Evaluation of Electrostatic Capacities>>

In addition to the capacitor AA', separately, the same capacitors the number of which were nine were formed, as well as in addition to each of the capacitors BA', CA', and AA.

The capacitors AA', as well as the other capacitors, were charged at 2 $mA/cm^2$ for 2 hours and then discharged at 1 $mA/cm^2$ to examine the initial electrostatic capacities, the charge voltages, and the operating voltage ranges. The respective averages of these examined values are shown in Table 4.

TABLE 4

| Capacitor | Electrostatic capacity (F) | Charge voltage (V) | Operating voltage range (V) | Energy (Ws) |
|---|---|---|---|---|
| AA' | 1.45 | 4.2 | 4.2-2.5 | 8.3 |
| BA' | 0.17 | 4.2 | 4.2-2.5 | 0.97 |
| CA' | Unable to be measured | Unable to be measured | Unable to be measured | Unable to be measured |
| AA | 1.45 | 2.5 | 2.5-0 | 4.5 |

In the capacitors CA', the voltage came not to be raised in the middle of the initial charging, so that the capacitors were unable to be charged. It is considered that this is because the Ni therein did not endure the positive electrode potential, so as to be dissolved, so that electric current was used for side-reaction and others.

As is evident from Table 4, the capacitors AA' were larger in capacity than the capacitors BA' using the Al foil for their current collector of positive electrode. The capacitors AA' were also larger in operating voltage range than the capacitors AA, in each of which both of the positive electrode and the negative electrode were rendered the Al porous bodies. The energy can be calculated from the following expression: ½C ($Emax^2 - Emin^2$) wherein C (F) represents the electrostatic capacity; the full charge voltage, Emax; and the voltage when the capacitor is discharged, Emin. The energy is in proportion to the electrostatic capacity, and the square of the voltage. Thus, the capacitors of the present invention can be improved in energy density.

<<Endurance Test 1>>

Next, the capacitors were examined about the endurance thereof, which is important as a capacitor characteristic. When any capacitor is kept at a high voltage, the endurance thereagainst is important in a case where the capacitor is used for backup or some other. While a charge voltage for each of the capacitors shown in Table 4 was applied to the capacitor at 65° C., the capacitor was kept as it was for 2000 hours. Thereafter, the temperature was set to 25° C., and then the electrostatic capacity was measured to examine the rate of a change in the electrostatic capacity from the initial value. The results are shown in Table 5.

TABLE 5

| | Electrostatic capacity (F) | | |
|---|---|---|---|
| Capacitor | Initial | After 2000 hours | Decrease percentage (%) |
| AA' | 1.45 | 1.446 | 0.28 |
| BA' | 0.17 | 0.169 | 0.59 |
| AA | 1.45 | 1.440 | 0.69 |

As is evident from Table 5, about the capacitors AA', in the same manner as about the capacitors AA, the change in the electrostatic capacity, as well as in the internal resistance, was small even when the 2000 hours elapsed. It has been therefore understood that the capacitors AA' can gain a high electrostatic capacity and exhibit excellent endurance.

<<Endurance Test 2>>

In another endurance-evaluating method, the capacitors were each examined about the charge/discharge cycle life. The cycle life is an important index for representing the lifespan of the cell. Conditions therefor are as follows: between voltages from 2.5 to 4.2 V about the capacitors AA' and BA', and between voltages from 0 to 2.5V about the capacitors AA, a charge/discharge cycle at a constant current of 1 mA was repeated 10000 times at an atmosphere temperature of 45° C. After the 10000 cycles, the discharge capacity was measured, and then evaluated by comparing the value thereof with the initial capacity thereof. The results are shown in Table 6.

TABLE 6

| Capacitor | Electrostatic capacity (F) | | |
| --- | --- | --- | --- |
| | Initial | After 10000 cycles | Decrease percentage (%) |
| AA' | 1.45 | 1.39 | 4.13 |
| BA' | 0.17 | 0.16 | 5.88 |
| AA | 1.45 | 1.38 | 4.83 |

As is evident from Table 6, the capacitors AA' were as small as a value less than 5% in electrostatic capacity change in the same way as the capacitors AA. It has been therefore understood that the capacitors AA' can gain a high electrostatic capacity and exhibit an excellent lifespan.

Test Example 4

The positive electrode A, and negative electrodes A' to C' described below were formed, and some combinations from these electrodes were used to produce capacitors AA', AB', AC', and AA. The produced capacitors were evaluated about the electrostatic capacity and the endurance thereof.

<<Capacitor AA'>>

(Formation of Positive Electrode A)

Prepared was the very same current collector a as produced in Test Example 2.

An activated carbon positive electrode paste was prepared by adding, to 21.5 parts by weight of an activated carbon powder (specific surface area 2500 m²/g, and average particle diameter: about 5 μm), 0.7 parts by weight of Ketjen Black (KB) as a conduction aid, 2.5 parts by weight of a polyvinylidene fluoride powder as a binder, and 75.3 parts by weight of N-methylpyrrolidone (NMP) as a solvent, and then stirring the components in a mixer.

This activated carbon paste was filled into the current collector a, the thickness of which was beforehand adjusted by means of a roller press machine having a gap width of 550 μm, to give an activated carbon content of 40 mg/cm². The filling amount thereof was actually 40.1 mg/cm². Next, the current collector was dried at 100° C. in a drying machine for 1 hour to remove the solvent, and then the workpiece was pressed by a roller press machine of 500 mm diameter (gap width: 250 μm). Thus, a positive electrode A of Example 1 was yielded. After the pressing, the thickness thereof was 350 μm.

(Formation of Negative Electrode A')

A Ni foam was formed by subjecting a urethane sheet (commercially available; average pre diameter: 470 μm, thickness: 1.4 mm, and porosity: 96%) to an electrically conducting treatment, plating the sheet with Ni to give a predetermined Ni amount, burning the urethane at 800° C. in the atmosphere to be removed, and heating the workpiece at 1000° C. in a reducing atmosphere (hydrogen) to reduce the Ni. In the electrically conducting treatment, Ni was deposited into a deposit amount of 10 g/m² by sputtering. The Ni plating amount was set in such a manner that the total Ni deposit amount including the amount based on the electrically conducting treatment would be 400 g/m².

The formed Ni foam had an average pore diameter of 470 μm, a thickness of 1.2 mm, and a porosity of 95%. This was called a current collector a'.

A silicon negative electrode paste was prepared by adding, to 21.5 parts by weight of a silicon powder (average particle diameter: 10 μm), 0.7 parts by weight of Ketjen Black (KB) as a conduction aid, 2.5 parts by weight of a polyvinylidene fluoride powder as a binder, and 75.3 parts by weight of N-methylpyrrolidone (NMP) as a solvent, and then stirring the components in a mixer.

This silicon paste was filled into the current collector a', the thickness of which was beforehand adjusted by means of a roller press machine having a gap width of 550 μm, to give a silicon content of 4 mg/cm². The filling amount thereof was actually 3.9 mg/cm². Next, the current collector was dried at 100° C. in a drying machine for 1 hour to remove the solvent, and then the workpiece was pressed by a roller press machine of 500 mm diameter (gap width: 50 μm). Thus, a positive electrode A' was yielded. After the pressing, the thickness thereof was 100 μm.

(Production of Capacitor AA')

The positive electrode A and the negative electrode A' were further dried at 200° C. in a reduced pressure environment for 8 hours. These were shifted to a drying room (dew point: −65° C.). The resultant positive electrode A and negative electrode A' were each punched into a diameter of 14 mm, and then a metallic Li foil of 50 μm thickness was bonded onto the negative electrode A' under pressure. A separator (thickness: 25 μm) made of polypropylene was sandwiched between both the electrodes to oppose the electrodes to each other. In this way, a single-cell element was produced. A spacer made of stainless steel was used to package the element into a coin-shaped cell case having an R2032 size. An electrolytic solution was poured into the case to impregnate the electrodes and the separator therewith, this solution being an electrolytic solution wherein $LiPF_6$ was dissolved in ethylene carbonate (EC) and diethyl carbonate (DEC) mixed with each other at a ratio by volume of 1:1, so as to give a concentration of 1 mol/L. Furthermore, a case cap was fastened to interpose an insulating gasket made from propylene therebetween, thereby closing the opening. In this way, a coin type capacitor A for tests was produced. Thereafter, the capacitor was allowed to stand still in a thermostat of 60° C. for 24 hours. By this operation, Li bonded to the negative electrode under the pressure was ionized to be adsorbed to the silicon of the negative electrode.

<<Capacitor AB'>>

As a negative electrode current collector, a Cu foil (commercially available, thickness: 20 μm) was used. The same negative electrode active material paste as prepared to form the negative electrode A' was painted onto the piece by a doctor blade method, and the resultant was rolled to form a negative electrode B' of Comparative Example 1. The amount of the applied paste was actually 2.5 mg/cm², and the thickness of the electrode was 90 μm.

Operations after this time were made in the very same manner as used to produce the capacitor AA' to produce a coin type capacitor AB'.

<<Capacitor AC'>>

A graphite negative electrode paste was prepared by adding, to 21.5 parts by weight of a natural graphite powder capable of adsorbing and releasing Li, 0.7 parts by weight of Ketjen Black (KB) as a conduction aid, 2.5 parts by weight of a polyvinylidene fluoride powder as a binder, and 75.3 parts by weight of N-methylpyrrolidone (NMP) as a solvent, and then stirring the components in a mixer.

This graphite negative electrode paste was filled into the current collector a', the thickness of which was beforehand adjusted by means of a roller press machine having a gap width of 550 μm, to give the same capacity as given by the negative electrode A'. The filling amount thereof was actually 22 mg/cm². Next, the current collector was dried at 100° C. in a drying machine for 1 hour to remove the solvent, and then the workpiece was pressed by a roller press machine of 500 mm diameter (gap width: 150 μm). Thus, a positive electrode C' was yielded. After the pressing, the thickness thereof was 235 μm.

Operations after this time were made in the very same manner as used to produce the capacitor AA' to produce a coin type capacitor AC'.

<<Capacitor AA>>

An electrode identical with the positive electrode A was used as a negative electrode to produce a capacitor AA. The electrolytic solution used therein was a solution wherein tetraethylammonium tetrafluoroborate was dissolved in propylene carbonate to give a concentration of 1 mol/L, and the used separator was a cellulose fiber separator (thickness: 60 μm, density: 450 mg/cm³, and porosity: 70%).

<<Evaluation of Electrostatic Capacities>>

In addition to the capacitor AA', separately, the same capacitors the number of which was nine were formed, as well as in addition to each of the capacitors AB', AC', and AA. The capacitors AA', as well as the other capacitors, were charged at 10 mA/cm² for 1 hour and then discharged at 10 mA/cm² to examine the initial electrostatic capacities, the charge voltages, the operating voltage ranges, and the energy densities. The volume used as a standard for each of the energy densities was rendered the volume of the electrode laminate inside the cell. This volume was calculated out in accordance with the following: ("the thickness of the positive electrode"+"the thickness of the separator"+"the thickness of the negative electrode")×"the electrode area". The respective averages of these examined values are shown in Table 7.

TABLE 7

| Capacitor | Electrostatic capacity (F) | Charge voltage (V) | Operating voltage range (V) | Energy (Ws) | Energy density (Wh/L) |
|---|---|---|---|---|---|
| AA' | 2.47 | 4.2 | 4.2-2.5 | 15.7 | 59.0 |
| AB' | 2.45 | 4.2 | 4.2-2.5 | 15.5 | 60.0 |
| AC' | 2.39 | 4.2 | 4.2-2.5 | 15.3 | 45.9 |
| AA | 2.44 | 2.5 | 2.5-0 | 6.2 | 18.3 |

As is evident from Table 7, the capacitors AA' were larger in operating voltage range than the capacitors AA, which were not doped with Li. By the comparison of the capacitors AA' with the capacitors AC', it has been understood that the use of silicon, which is larger in capacity than graphite, as a negative electrode makes it possible to make the negative electrode thin to realize a high energy density.

<Endurance Test 1>

Next, the capacitors were examined about the endurance thereof, which is important as a capacitor characteristic. When any capacitor is kept at a high voltage, the endurance thereagainst is important in a case where the capacitor is used for backup or some other. While a charge voltage for each of the capacitors shown in Table 7 was applied to the capacitor at 65° C., the capacitor was kept as it was for 2000 hours. Thereafter, the temperature was set to 25° C., and then the electrostatic capacity was measured to examine the rate of a change in the electrostatic capacity from the initial value. The results are shown in Table 8.

TABLE 8

| | Electrostatic capacity (F) | | |
|---|---|---|---|
| Capacitor | Initial | After 2000 hours | Decrease percentage (%) |
| AA' | 2.47 | 2.44 | 1.2 |
| AB' | 2.45 | 2.41 | 1.6 |
| AC' | 2.39 | 2.36 | 1.3 |
| AA | 2.44 | 2.41 | 1.2 |

As is evident from Table 8, about the capacitors AA', in the same manner as about the capacitors AA, which were structured not to be doped with Li, the change in the electrostatic capacity, as well as in the internal resistance, was small even when the 2000 hours elapsed. It has been therefore understood that the capacitors AA' can gain a higher electrostatic capacity than the other structures and exhibit excellent endurance.

<Endurance Test 2>

In another endurance-evaluating method, the capacitors were each examined about the charge/discharge cycle life. The cycle life is an important index for representing the lifespan of the cell. Conditions therefor are as follows: at an atmosphere temperature of 45° C., between voltages from 0.5 to 3.0 V, a charge/discharge cycle at a constant current of 10 mA/cm² was repeated 10000 times. After the 10000 cycles, the discharge capacity was measured, and then evaluated by comparing the value thereof with the initial capacity thereof. The results are shown in Table 9.

TABLE 9

| | Electrostatic capacity (F) | | |
|---|---|---|---|
| Capacitor | Initial | After 10000 cycles | Decrease percentage (%) |
| AA' | 2.47 | 2.39 | 3.2 |
| AB' | 2.45 | 0.56 | 77 |
| AC' | 2.39 | 2.31 | 3.3 |
| AA | 2.44 | 2.38 | 2.5 |

As is evident from Table 9, the capacitors AA' were small in electrostatic capacity change in the same way as the capacitors AA, which were structured not to be doped with Li, even after the 10000 cycles elapsed. However, about the capacitors AB', wherein the Cu foil was used, the capacity was largely decreased. The cells were dismantled after the tests. As a result, the Cu foil of each of their negative electrode current collectors proved to be exposed. Thus, it is considered that the capacity-decrease was caused by peeling of the negative electrode silicon. It has been therefore understood that the capacitors AA' can gain a higher electrostatic capacity than the other structures and exhibit an excellent lifespan.

Embodiments of the present invention are not limited to the above-mentioned embodiment. The embodiment may be appropriately varied as far as the variants do not depart from the subject matter of the present invention.

INDUSTRIAL APPLICABILITY

The capacitor of the present invention can be favorably used for, for example, a backup power source for an IC memory, a flashing road sign, a flashing road rivet, or some other.

(REFERENCE SIGNS LIST)

| | |
|---|---|
| 1: resin | 1f: resin body |
| 2: al layer | |
| 3: al-layer-coated resin body | |
| 5: counter electrode (positive electrode) | |
| 6: molten salt | |
| 100: capacitor | |
| 10: positive electrode (electrode) | |
| 10a: positive electrode body | 10b: substrate |
| 11: al porous body | 12, 13: electrode material |
| 13a: conductive fine particles | |
| 13b: electrolyte fine particles | |
| 20: negative electrode (electrode) | |
| 20a: negative electrode body | 20b: substrate |
| 30: electrolyte layer | |

The invention claimed is:

1. A capacitor, comprising a positive electrode, a negative electrode, and an electrolyte layer arranged between these electrodes,
   wherein at least one of the electrodes comprises an Al porous body functioning as a current collector, and an electrode material that is held in the Al porous body to polarize the electrolyte, and
   an oxygen content in a surface of the Al porous body is 3.1% by mass or less, and
   wherein the positive electrode comprises the Al porous body, and the electrode material that is made mainly of activated carbon,
   the negative electrode comprises a porous metal for the negative electrode, and a negative-electrode active material that is made mainly of an element that adsorbs Li ions and releases the Li ions, and that is filled into pores in the porous metal for the negative electrode,
   the electrolyte layer is a combination of a nonaqueous electrolytic solution containing a Li salt, and a separator, and
   Li ions are chemically or electrochemically adsorbed onto the negative electrode.

2. The capacitor according to claim 1, wherein the negative-electrode active material is an alloy or a complex containing 20% by mass or more of the element, and
   the element is at least one of Al, Sn, and Si.

3. The capacitor according to claim 1, wherein the porous metal for the negative electrode is a Ni foam that is obtained by coating a urethane foam with Ni, and then burning off the urethane, and that has a porosity of 80% or more and 97% or less, and a Ni deposit amount of 150 g/m$^2$ or more and 600 g/m$^2$ or less.

4. The capacitor according to claim 1, wherein the porous metal for the negative electrode is a Ni nonwoven fabric that is obtained by coating a nonwoven fabric made from a polyolefin fiber with Ni, and that has a porosity of 80% or more and 97% or less, and a Ni deposit amount of 150 g/m$^2$ or more and 600 g/m$^2$ or less.

5. The capacitor according to claim 1, wherein the Li salt is one or more selected from the group consisting of LiClO$_4$, LiBF$_4$, and LiPF$_6$, and a solvent in the nonaqueous electrolytic solution is one or more selected from the group consisting of ethylene carbonate, propylene carbonate, butylene carbonate, dimethyl carbonate, diethyl carbonate, and ethylmethyl carbonate.

6. The capacitor according to claim 1, wherein the capacity of the negative electrode is larger than that of the positive electrode, and the Li-ion-adsorbing amount of the negative electrode is 90% or less of the difference between the positive electrode capacity and the negative electrode capacity.

7. A capacitor, comprising a positive electrode, a negative electrode, and an electrolyte layer arranged between these electrodes,
   wherein at least one of the electrodes comprises an Al porous body functioning as a current collector, and an electrode material that is held in this Al porous body to polarize the electrolyte, and
   an oxygen content in a surface of the Al porous body is 3.1% by mass or less, and
   wherein the positive electrode comprises the Al porous body, and the electrode material that is made mainly of activated carbon,
   the negative electrode comprises a metal foil, and a negative-electrode active material that is made mainly of a carbon material that adsorbs Li ions and releases the Li ions, and that is applied onto the metal foil,
   the electrolyte layer is a combination of a nonaqueous electrolytic solution containing a Li salt, and a separator, and
   Li ions are chemically or electrochemically adsorbed onto the negative electrode.

8. The capacitor according to claim 7, wherein the carbon material that adsorbs Li ions and releases the Li ions is a graphite-based material, or an easily-graphitizable carbon material.

9. The capacitor according to claim 7, wherein the metal foil is any one of Cu, Ni, and stainless steel.

10. The capacitor according to claim 7, wherein the Li salt is one or more selected from the group consisting of LiClO$_4$, LiBF$_4$, and LiPF$_6$, and
    a solvent in the nonaqueous electrolytic solution is one or more selected from the group consisting of ethylene carbonate, propylene carbonate, butylene carbonate, dimethyl carbonate, diethyl carbonate, and ethylmethyl carbonate.

11. The capacitor according to claim 7, wherein the capacity of the negative electrode is larger than that of the positive electrode, and the Li-ion-adsorbing amount of the negative electrode is 90% or less of the difference between the positive electrode capacity and the negative electrode capacity.

* * * * *